(12) United States Patent
Shattil

(10) Patent No.: US 10,637,705 B1
(45) Date of Patent: Apr. 28, 2020

(54) PEAK-TO-AVERAGE-POWER REDUCTION FOR OFDM MULTIPLE ACCESS

(71) Applicant: Genghiscomm Holdings, LLC, Boulder, CO (US)

(72) Inventor: Steve Shattil, Cheyenne, WY (US)

(73) Assignee: Genghiscomm Holdings, LLC, Boulder, CO (US)

( * ) Notice: Subject to any disclaimer, the term of this patent is extended or adjusted under 35 U.S.C. 154(b) by 84 days.

(21) Appl. No.: 15/988,898

(22) Filed: May 24, 2018

Related U.S. Application Data

(60) Provisional application No. 62/510,987, filed on May 25, 2017, provisional application No. 62/527,603, filed on Jun. 30, 2017, provisional application No. 62/536,955, filed on Jul. 25, 2017.

(51) Int. Cl.

| | |
|---|---|
| *H04L 27/26* | (2006.01) |
| *H04L 1/18* | (2006.01) |
| *H04W 72/04* | (2009.01) |
| *H04B 7/06* | (2006.01) |
| *H04B 7/0456* | (2017.01) |
| *H04L 5/00* | (2006.01) |

(52) U.S. Cl.
CPC ....... *H04L 27/2636* (2013.01); *H04B 7/0456* (2013.01); *H04B 7/0632* (2013.01); *H04L 1/1861* (2013.01); *H04W 72/0406* (2013.01); *H04L 5/0007* (2013.01)

(58) Field of Classification Search
CPC . H04L 27/2636; H04L 1/1861; H04L 5/0007; H04B 7/0456; H04B 7/0632; H04W 72/0406

USPC .......................................... 370/310, 328, 329
See application file for complete search history.

(56) References Cited

U.S. PATENT DOCUMENTS

| | | |
|---|---|---|
| 5,955,992 A | 9/1999 | Shattil |
| 6,686,879 B2 | 2/2004 | Shattil |
| 7,010,048 B1 | 3/2006 | Shattil |
| 7,076,168 B1 | 7/2006 | Shattil |
| 7,286,604 B2 | 10/2007 | Shattil |
| 7,317,750 B2 | 1/2008 | Shattil |
| 7,391,804 B2 | 6/2008 | Shattil |
| 7,406,261 B2 | 7/2008 | Shattil |

(Continued)

OTHER PUBLICATIONS

H. Prakash, C.D.Suriyakala; "PAPR Reduction in MIMO SC-FDMA—A Survey"; Int. J Rec. Adv. Sci. Tech., 2015; 2(2)11-19.

(Continued)

*Primary Examiner* — Obaidul Huq
(74) *Attorney, Agent, or Firm* — Steven J Shattil

(57) ABSTRACT

An Orthogonal Frequency Division Multiplexing (OFDM) transmitter generates OFDM multiple-access signals with low Peak-to-Average-Power Ratio (PAPR). A code-division multiplexer arranges original data symbols from different data streams inside each length-N symbol block, which is spread by a Discrete Fourier Transform (DFT) spreader. The arrangement of the original data symbols configures the DFT spreader to spread each original data symbol into a predetermined spread-DFT code division multiple access channel. The resulting DFT-spread data symbols are mapped to OFDM subcarriers, and an inverse discrete Fourier transform (IDFT) operates on the DFT-spread data symbols to generate an OFDM transmission signal having low PAPR.

24 Claims, 14 Drawing Sheets

(56) References Cited

U.S. PATENT DOCUMENTS

| | | |
|---|---|---|
| 7,418,043 B2 | 8/2008 | Shattil |
| 7,430,257 B1 | 9/2008 | Shattil |
| 7,787,514 B2 | 8/2010 | Shattil |
| 8,670,390 B2 | 3/2014 | Shattil |
| 8,885,628 B2 | 10/2014 | Palanki et al. |
| 8,929,550 B2 | 1/2015 | Shattil |
| 8,942,082 B2 | 1/2015 | Shattil |
| 9,225,471 B2 | 12/2015 | Shattil |
| 9,485,063 B2 | 11/2016 | Shattil |
| 9,628,231 B2 | 4/2017 | Shattil |
| 9,693,339 B2 | 6/2017 | Palanki et al. |
| 9,798,329 B2 | 10/2017 | Shattil |
| 2005/0265293 A1 | 12/2005 | Ro et al. |
| 2006/0262870 A1 | 11/2006 | Khan |
| 2007/0183386 A1 | 8/2007 | Muharemovic et al. |
| 2007/0211807 A1 | 9/2007 | Han et al. |
| 2008/0095121 A1 | 4/2008 | Shattil |
| 2009/0147870 A1 | 6/2009 | Lin et al. |
| 2009/0274103 A1 | 11/2009 | Yang et al. |
| 2009/0304108 A1 | 12/2009 | Kwon et al. |
| 2010/0110875 A1 | 5/2010 | No et al. |
| 2010/0165829 A1 | 7/2010 | Narasimha et al. |
| 2011/0096658 A1 | 4/2011 | Yang et al. |
| 2011/0206207 A1 | 8/2011 | Priotti |
| 2011/0281534 A1 | 11/2011 | Liao et al. |
| 2012/0014392 A1* | 1/2012 | Bhushan ............... H04L 5/0042 370/441 |
| 2012/0224517 A1 | 9/2012 | Yun et al. |
| 2012/0294346 A1 | 11/2012 | Kolze |
| 2014/0198863 A1 | 7/2014 | Terry |
| 2015/0009971 A1* | 1/2015 | Han ........................ H04L 5/001 370/336 |
| 2015/0103723 A1 | 4/2015 | Kim et al. |
| 2015/0195840 A1 | 7/2015 | Ahn et al. |
| 2015/0271000 A1 | 9/2015 | Yang et al. |
| 2015/0304153 A1 | 10/2015 | Moffatt et al. |
| 2015/0358190 A1 | 12/2015 | Kruglick et al. |
| 2016/0050096 A1 | 2/2016 | DelMarco |
| 2016/0050099 A1 | 2/2016 | Siohan et al. |
| 2016/0197756 A1 | 7/2016 | Mestdagh et al. |
| 2016/0269083 A1 | 9/2016 | Porat et al. |
| 2016/0353446 A1 | 12/2016 | Abdoli et al. |
| 2017/0019284 A1 | 1/2017 | Ankarali et al. |
| 2017/0126454 A1 | 5/2017 | Huan et al. |
| 2017/0134202 A1 | 5/2017 | Baligh et al. |
| 2017/0134235 A1 | 5/2017 | Wu et al. |
| 2017/0250848 A1 | 8/2017 | Lee et al. |
| 2017/0264474 A1 | 9/2017 | He et al. |
| 2017/0279648 A1 | 9/2017 | Song et al. |
| 2017/0295000 A1* | 10/2017 | Yoo ..................... H04L 27/2636 |
| 2017/0353340 A1 | 12/2017 | Raphaeli et al. |
| 2018/0062904 A1 | 3/2018 | Hwang et al. |
| 2018/0091338 A1 | 3/2018 | Mayer et al. |
| 2018/0109408 A1 | 4/2018 | Sandell et al. |
| 2018/0167244 A1 | 6/2018 | Cheng et al. |
| 2018/0191543 A1 | 7/2018 | Park et al. |
| 2018/0212810 A1 | 7/2018 | Park et al. |

OTHER PUBLICATIONS

E. Hajlaoui, M. Abdellaoui; "SOCP Approach for Reducing PAPR for MIMO-OFDM Via Tone Reservation"; International Journal of Distributed and Parallel Systems (IJDPS) vol. 2, No. 3, May 2011.
J. Shin, B. Seo; "PAPR Reduction Scheme for MISO and MIMO OFDM Systems with Limited Feedback"; WSEAS Transactions on Communications 13:355-362 · Jan. 2014.
D. Sinanovic, et al.; "Low PAPR Spatial Modulation for SC-FDMA"; IEEE Transactions on Vehicular Technology; vol. 66, Issue: 1, Jan. 2017.
G.H. Karande, et al.; "Peak-to-Average Power Reduction in MIMO-OFDM Systems using SLM technique"; IPASJ International Journal of Electronics & Communication (IIJEC); vol. 2, Issue 8, Aug. 2014.
M. Lieberei, U. Zolzer; "Time Domain PAPR Reduction in MIMO-OFDM Spatial Multiplexing Systems"; in Proceedings of the 14th International OFDM-Workshop (InOWo'09), S. 218-222, 2009.
M. Vu, A. Paulraj; "MIMO Wireless Linear Precoding"; IEEE Signal Processing Magazine. Submitted Feb. 2006, revised Nov. 2006 and Dec. 2006.
H.G. Myung, et al.; "Peak Power Characteristics of Single Carrier FDMA MIMO Preceding System"; 2007 IEEE 66th Vehicular Technology Conference, Sep. 30-Oct. 3, 2007.
B. Naik, et al.; "Reduction of PAPR in MIMO-OFDM/A System Using Polyphase Complementary Modulation"; International Journal of Innovative Research in Computer and Communication Engineering; vol. 2, Issue 5, May 2014.
A.S. Parihar, A. Rai; "A Review: PAPR Reduction Techniques in MIMO OFDM System"; International Journal of Engineering and Innovative Technology (IJEIT); vol. 4, Issue 12, Jun. 2015.
B. Rihawi, Y.Louet; "PAPR Reduction Scheme with SOCP for MIMO-OFDM Systems"; I. J. Communications, Network and System Sciences. 2008; 1: 1-103; Published Online Feb. 2008 in SciRes (http://www.SRPublishing.org/journal/ijcns/).
C.A. Devlin, et al.; "Peak to Average Power Ratio Reduction Technique for OFDM Using Pilot Tones and Unused Carriers"; 2008 IEEE Radio and Wireless Symposium; Year: 2008; pp. 33-36.
K Mhatre, U.P. Knot; "Efficient Selective Mapping PAPR Reduction Technique"; International Conference on Advanced Computing Technologies and Applications (ICACTA-2015); Procedia Computer Science 45 ( 2015) 620-627.
K. Srinivasarao, et al.; "Peak-to-Average Power Reduction in MIMO-OFDM Systems Using Sub-Optimal Algorithm"; International Journal of Distributed and Parallel Systems (IJDPS) vol. 3, No. 3, May 2012.
K. Xu, et al.; "Beamforming MISO-OFDM PAPR Reduction: A Space-User Perspective"; 2007 IEEE International Conference on Acoustics, Speech and Signal Processing—ICASSP '07, Apr. 15-20, 2007.
H. Zhang, D.L Goeckel; "Peak Power Reduction in Closed-Loop MIMO-OFDM Systems via Mode Reservation"; IEEE Communications Letters, vol. 11, No. 7, Jul. 2007.
C.L. Wang, Y. Ouyang; "Low-Complexity Selected Mapping Schemes for Peak-to-Average Power Ratio Reduction in OFDM Systems"; IEEE Transactions on Signal Processing, vol. 53, No. 12, Dec. 2005.
P. Sindhu, G. Krishnareddy; "Peak and Average Power Reduction in OFDM System with Trellis Shaping Method"; International Journal of Advanced Research in Electrical, Electronics and Instrumentation Engineering; vol. 3, Issue 7, Jul. 2017.
H-B Jeon, et al.; "Bit-Based SLM Schemes for PAPR Reduction in QAM Modulated OFDM Signals"; IEEE Transactions on Broadcasting, vol. 55, No. 3, Sep. 2009.
H-B Jeon, et al.; "A Low-Complexity SLM Scheme Using Additive Mapping Sequences for PAPR Reduction of OFDM Signals"; IEEE Transactions on Broadcasting, vol. 57, No. 4, Dec. 2011.
S-J Heo, et al.; "A Modified SLM Scheme With Low Complexity for PAPR Reduction of OFDM Systems"; IEEE Transactions on Broadcasting, vol. 53, No. 4, Dec. 2007.
M.I. Abdullah, et al.; "Comparative Study of PAPR Reduction Techniques in OFDM"; ARPN Journal of Systems and Software; vol. 1, No. 8, Nov. 2011.
E. Abdullah, et al.; "Modified selective mapping scheme with low complexity for minimizing high peakaverage power ratio in orthogonal frequency division multiplexing system"; AIP Conference Proceedings 1774, 050005 (2016).
S.T. O'Hara, J.R. Periard; "Orthogonal-Coded Selective Mapping (OCSM) for OFDM Peakto-Average Power Reduction Without Side Information"; Proceeding of the SDR 04 Technical Conference and Product Exposition 2004, Syracuse, NY, Technology Center—Syracuse Research Corporation. 2004.
P. Sharma, S. Verma; "PAPR Reduction of OFDM Signals Using Selective Mapping With Turbo Codes"; International Journal of Wireless & Mobile Networks (IJWMN) vol. 3, No. 4, Aug. 2011.
D. Wiegandt et al., "Overcoming peak-to-average power ratio issues in OFDM via carrier-interferometry codes", VTC 2001 Fall. IEEE VTS 54th Vehicular Technology Conference, 2001, vol. 2, pp. 660-663, Oct. 7-11, 2001.

(56) References Cited

OTHER PUBLICATIONS

B. Natarajan, et al. "Crest factor considerations in MC-CDMA with carrier interferometry codes", PACRIM. 2001 IEEE Communications Pacific Rim Conference on Computers and signal Processing, 2001, vol. 2, pp. 445-448 Aug. 26-28, 2001.

C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.

C.R. Nassar, B. Natarajan, S. Shattil, "Introduction of carrier interference to spread spectrum multiple access," Wireless Communications and Systems, 1999 Emerging Technologies Symposium Apr. 12-13, 1999 pp. 4.1-4.5.

B. Natarajan, C.R. Nassar, S. Shattil, M. Michelini, and Z. Wu; "High-Performance MC-CDMA Via Carrier Interferometry Codes," Vehicular Technology, IEEE Transactions on; vol. 50, Issue 6, Nov. 2001, pp. 1344-1353.

Z. Wu, B. Natarajan, C.R. Nassar, S. Shattil; "High-performance, high-capacity MC-CDMA via carrier interferometry," Personal, Indoor and Mobile Radio Communications, 2001 12th IEEE International Symposium on; vol. 2, Sep. 30-Oct. 3, 2001 pp. G-11-G-16.

S.A. Zekavat; C.R. Nassar, S. Shattil; "The merger of a single oscillating-beam smart antenna and MC-CDMA: transmit diversity, frequency diversity and directionality," Broadband Communications for the Internet Era Symposium digest, 2001 IEEE Emerging Technologies Symposium on Sep. 10-11, 2001 pp. 107-112.

B. Natarajan, C.R. Nassar, S. Shattil; "Enhanced Bluetooth and IEEE 802.11 (FH) via multi-carrier implementation of the physical layer," Broadband Communications for the Internet Era Symposium digest, 2001 IEEE Emerging Technologies Symposium on; Sep. 10-11, 2001 pp. 129-133.

Z. Wu; C.R. Nassar, S. Shattil; "Ultra wideband DS-CDMA via innovations in chip shaping," Vehicular Technology Conference, 2001. VTC 2001 Fall. IEEE VTS 54th; vol. 4, Oct. 7-11, 2001 pp. 2470-2474.

B. Natarajan, C.R. Nassar, S. Shattil; "Innovative pulse shaping for high-performance wireless TDMA," Communications Letters, IEEE vol. 5, Issue 9, Sep. 2001 pp. 372-374.

B.Natarajan, C.R. Nassar and S.Shattil; "Throughput Enhancement in TDMA through Carrier Interference Pulse Shaping," IEEE Vehicular technology Conference Proceedings, vol. 4, Fall 2000, Boston, Sep. 24-28, 2000, pp. 1799-1803.

LTE: Evolved Universal Terrestrial Radio Access (E-UTRA); Multiplexing and channel coding (3GPP TS 36.212 version 8.8.0 Release 8), Jan. 2010.

LTE: Evolved Universal Terrestrial Radio Access (E-UTRA); Physical channels and modulation (3GPP TS 36.211 version 8.7.0 Release 8), Jun. 2009.

\* cited by examiner

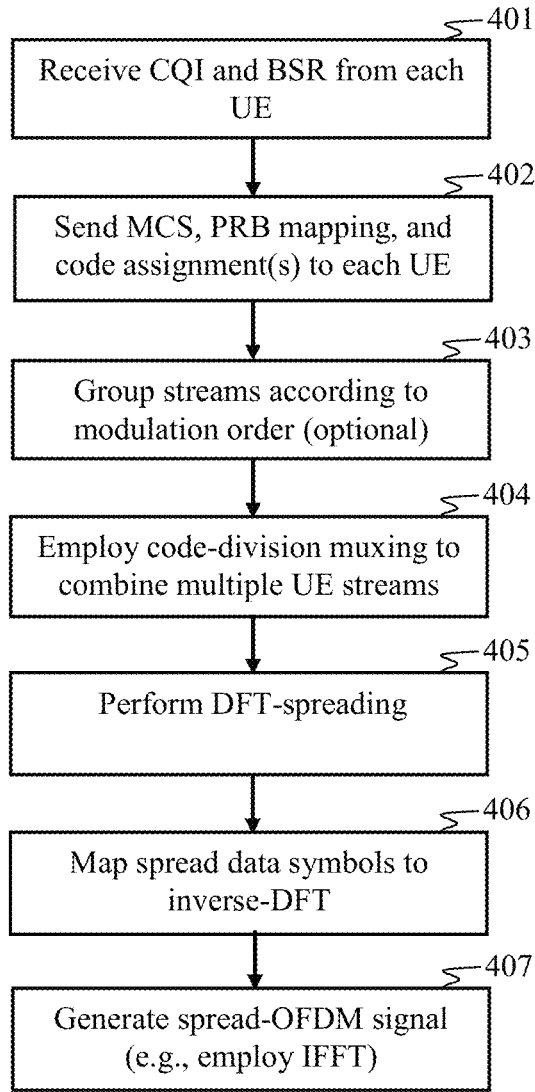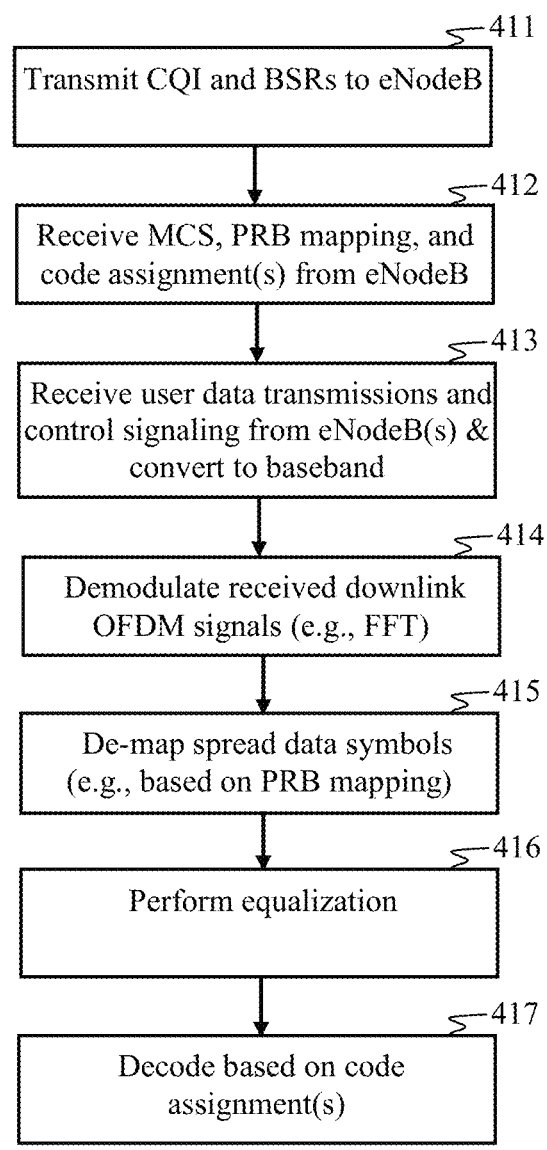
Figure 4A
Figure 4B

PEAK-TO-AVERAGE-POWER REDUCTION FOR OFDM MULTIPLE ACCESS

CROSS REFERENCE TO PRIOR APPLICATIONS

This application claims priority to Provisional Appl. No. 62/510,987, filed May 25, 2017; and Provisional Appl. No. 62/527,603, filed Jun. 30, 2017; and Provisional Appl. No. 62/536,955, filed Jul. 25, 2017; all of which are hereby incorporated by reference in their entireties and all of which this application claims priority under at least 35 U.S.C. 120 and/or any other applicable provision in Title 35 of the United States Code.

BACKGROUND

I. Field

The present invention relates generally to wireless communication networks, and more specifically to Peak-to-Average Power reduction of multicarrier waveforms.

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

In multi-user communications, orthogonal frequency division multiple access (OFDMA) offers flexible resource allocation (subcarrier allocations to users) and scheduling. Dynamic allocation can further improve performance compared to fixed allocation. For these reasons, OFDMA has been adopted as the downlink in LTE.

However, OFDMA suffers from high peak-to-average power ratio (PAPR) because the modulated subcarriers for different users combine randomly to produce a signal with highly variable amplitude. This requires RF power amplifiers (PAs) to operate with large back-offs (i.e., transmitter PAs are made to operate at low efficiency operating points to ensure linearity). This trade-off is acceptable in sparse deployments of large base stations.

In dense LTE deployments, base stations are more power constrained, as dense deployments demand radio terminals that are significantly less expensive and operate at lower power. As LTE adopts fixed and mobile relays, the network infrastructure will rely on autonomously powered (e.g., solar-powered) and battery-powered devices for downlink support. This will further drive the need for improvements in power-efficient downlink signaling.

Similarly, user devices can be tasked with relaying WWAN radio transmissions. In some aspects, user devices can cooperate, such as to transmit OFDM multiple-access signals in the uplink. For at least these reasons, improvements to PAPR-reduction in both the uplink and downlink signaling are needed. Peer-to-peer communications between user devices and communications between clusters of user devices are also envisioned. Thus, there is a need for improvements to OFDM multiple access that reduce PAPR while providing for flexible resource allocation and scheduling.

SUMMARY

In accordance with some aspects of the disclosure, these needs are remedied. Aspects disclosed herein can be configured for downlink, uplink, relay links, peer-to-peer links, as well as other communication links across any network topologies.

In the downlink (e.g., at least one base station transmitting to one or more terminals), some literature states that multiple access reduces to multiplexing. However, other literature refers to downlink multiplexing of different user channels as multiple access. For example, in the 3GPP Long-Term Evolution (LTE) fourth-generation mobile broadband standard, the downlink is commonly described as orthogonal frequency-division multiple access (OFDMA), which is the multi-user version of OFDM. Multiple access is typically achieved in OFDMA by assigning subsets of the subcarriers to individual users. Aspects of the disclosure that provide for downlink transmissions wherein a plurality of user channels are combined over a shared medium is referred to as multiplexing. However, in view of the literature, such aspects can also be qualified as multiple access.

As an alternative to the downlink scheme in LTE, some aspects of the disclosure provide for multicarrier code division multiplexing, wherein user data from each of a plurality of UEs is spread by employing DFT spreading to produce a plurality of spread data symbols. The spread data symbols are then carried over different OFDM subcarrier frequencies.

Specifically, whereas the OFDMA scheme in LTE assigns a different subcarrier set to each UE, aspects of the disclosure provide for transmitting data to a plurality of UEs by using the same subcarriers. Aspects of the disclosure can employ code division multiplexing whereby each UE channel is provided with a different code set. This enables the use of DFT spreading on the downlink in a manner that produces substantial PAPR reduction of the transmission signal. Specifically, since the UEs share all N subcarriers instead of being assigned subsets (e.g., $N_1, N_2, \ldots, N_K$; where $N=N_1+N_2+\ldots+N_K$) of the subcarriers, DFT spreading can be performed as a single N-point spreading operation across the N subcarriers to yield lower PAPR than if separate spreading operations are performed across the subsets and then combined.

In aspects of the disclosure, the spread user signals on the downlink can be easily synchronized, and all signals on one subcarrier experience the same radio channel properties. In such cases, an exemplary implementation maps different UE user data (and optionally, control signal data) to a symbol block of length-N. The mapping to specific positions in the block provides for code-set assignment. The block is input to an N-point FFT to generate spread data symbols, which are mapped to input bins of an IFFT. The IFFT may be an oversampling IFFT (e.g., an M-point IFFT, where M>N).

While the addition of the DFT spreading in the downlink transmitter requires a corresponding de-spreader in the UE receiver, there are some compelling advantages that can justify the added complexity. First, the spreading improves performance in the radio-access channel. The performance gain represents a larger budget for a combination of benefits, including reduced receiver power, improved error rate, support for higher modulation order, increased range, and more reliable coverage. Secondly, since each user employs the full set of subcarrier frequencies instead of a subset, the resulting diversity gain further improves the performance in the radio-access channel. Third, a codeword in a downlink DFT-spread signal provides finer information granularity than the LTE resource block. This can enhance overall network bandwidth efficiencies. Additional advantages and benefits can be realized for the aspects disclosed herein.

In one aspect, a base transceiver station (BTS) configured to provide downlink data transmissions to a plurality of user devices in a radio access network comprises a code-division multiplexer configured to multiplex a plurality of user data streams into a set of symbol blocks. A DFT pre-coder coupled to the multiplexer spreads each symbol block with a set of spreading codes comprising coefficients of a DFT to generate a plurality of spread data symbols. An OFDM transmitter modulates the plurality of spread data symbols onto a plurality of downlink OFDM subcarrier frequencies for transmission.

Aspects disclosed herein can be implemented as apparatus configurations comprising structural features that perform the functions, algorithms, and methods described herein. Flow charts and descriptions disclosed herein can embody instructions, such as in software residing on a non-transitory computer-readable medium, configured to operate a processor (or multiple processors). Flow charts and functional descriptions, including apparatus diagrams, can embody methods for operating a communication network(s), coordinating operations which support communications in a network(s), operating network components (such as client devices, server-side devices, relays, and/or supporting devices), and assembling components of an apparatus configured to perform the functions disclosed herein.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth herein.

The following patent applications and patents are hereby incorporated by reference in their entireties:
U.S. Pat. No. 8,670,390,
U.S. Pat. No. 9,225,471,
U.S. Pat. No. 9,270,421,
U.S. Pat. No. 9,325,805,
U.S. Pat. No. 9,473,226,
U.S. Pat. No. 8,929,550,
U.S. Pat. No. 7,430,257,
U.S. Pat. No. 6,331,837,
U.S. Pat. No. 7,076,168,
U.S. Pat. No. 7,965,761,
U.S. Pat. No. 8,098,751,
U.S. Pat. No. 7,787,514,
U.S. Pat. No. 9,673,920,
U.S. Pat. No. 9,628,231,
U.S. Pat. No. 9,485,063,
patent application Ser. No. 10/145,854,
patent application Ser. No. 14/789,949,
Pat. Appl. No. 62/197,336,
patent application Ser. No. 14/967,633,
Pat. Appl. No. 60/286,850,
patent application Ser. No. 14/709,936,
patent application Ser. No. 14/733,013,
patent application Ser. No. 14/789,949,
patent application Ser. No. 13/116,984,
patent application Ser. No. 15/218,609,
patent application Ser. No. 15/347,415,
J. S. Chow, J. M. Cioffi, J. A. C. Bingham; "Equalizer Training Algorithms for Multicarrier Modulation Systems", Communications, 1993. ICC '93 Geneva. Technical Program, Conference Record, IEEE International Conference on; Vol: 2, 23-26 May 1993, pp. 761-765;
Vrcelj et al. "Pre- and post-processing for optimal noise reduction in cyclic prefix based channel equalizers", Communications, 2002. ICC 2002. IEEE International Conference on. Vol. 1. IEEE, 2002;
LTE: Evolved Universal Terrestrial Radio Access (E-UTRA); Physical channels and modulation (3GPP TS 36.211 version 8.7.0 Release 8), June 2009; and
LTE: Evolved Universal Terrestrial Radio Access (E-UTRA); Multiplexing and channel coding (3GPP TS 36.212 version 8.8.0 Release 8), January 2010.

All of the references disclosed herein all are incorporated by reference in their entireties.

BRIEF DESCRIPTION OF DRAWINGS

Flow charts depicting disclosed methods comprise "processing blocks" or "steps" may represent computer software instructions or groups of instructions. Alternatively, the processing blocks or steps may represent steps performed by functionally equivalent circuits, such as a digital signal processor or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied. Unless otherwise stated, the steps described below are unordered, meaning that the steps can be performed in any convenient or desirable order.

FIG. 4A is a flow diagram for a method performed in a radio transceiver, which can employ single-carrier frequency division multiple access (SC-FDMA) to produce a multiple-access OFDM transmission signal with reduced PAPR.

FIG. 4B is a flow diagram for a method that can be employed in accordance with various aspects of the disclosure, such as for processing received spread-OFDM signals. In one aspect, for example, the method depicted in FIG. 4B can be performed by a user equipment (UE) or a relay operating on received downlink signals.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
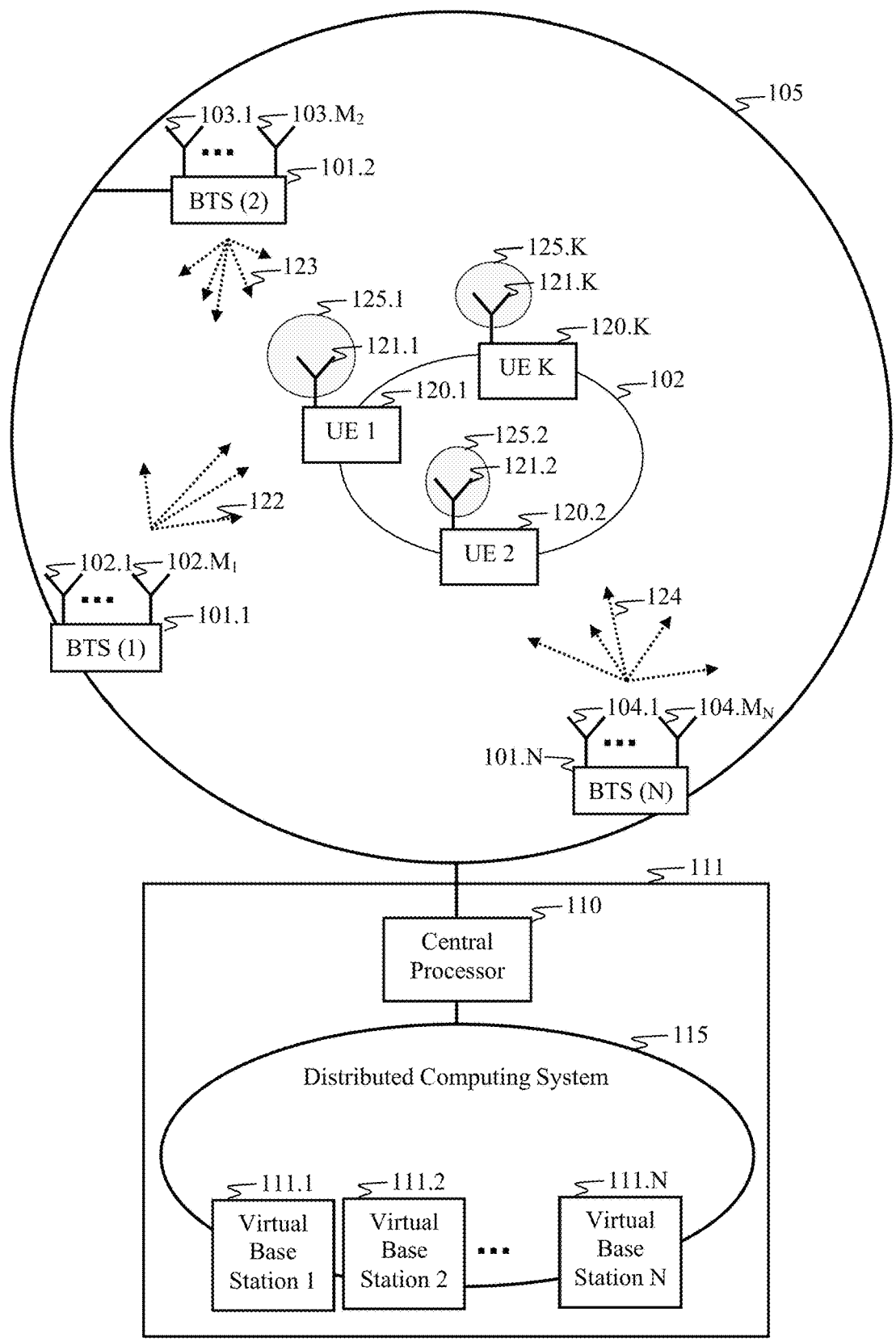
FIG. 1 is a block diagram of a radio communication system in which exemplary aspects of the disclosure can be implemented. Aspects of the disclosure are not limited to the depicted system design, as such aspects can be implemented in alternative systems, system configurations, and applications.

FIG. 1 is a block diagram of a communication network in which aspects of the disclosure can be implemented. A plurality N of geographically distributed base transceiver stations (BTSs) 101.1-101.N (BTS(1), BTS(2), . . . , BTS (N)) are communicatively coupled to at least one central processing system 111 via a communication network 105. Each BTS 101.1-101.N comprises an antenna system configured for communicating with one or more mobile units (e.g., User Equipments, or UEs) 120.1-120.K via a WWAN radio access network (RAN).

In one aspect, the first base transceiver station 101.1 comprises a first antenna array comprising a first plurality A of antennas $102.1$-$102.M_1$, the second base transceiver station 101.2 comprises a second antenna array comprising a second plurality $M_2$ of antennas $102.1$-$102.M_1$, and the $N^{th}$ base transceiver station 101.N comprises an $N^{th}$ antenna array comprising an $N^{th}$ plurality $M_N$ of antennas $104.1$-$104.M_N$. The base transceiver stations 101.1-101.N are configured to provide RAN services to a plurality K of mobile units 120.1, 120.2, . . . , 120.K, each having its own antenna system 121.1, 121.2, . . . , 121.K, respectively. Each antenna system 121.1, 121.2, . . . , 121.K comprises one or more antennas.

The communication network 105 can comprise a fiber network, a cable (e.g., "wired") network, a wireless network (including a free-space optical network), or any combination thereof. In some aspects, the network 105 is referred to as a "fronthaul" network. In some aspects, the network 105 can comprise a backhaul network. In accordance with one aspect of the disclosure, a network that connects base transceiver stations to a processing system configured to perform joint processing (e.g., system 111) can be referred to as a fronthaul, and a network (such as network 115) that connects processing elements of the processing system 111 can be referred to as a backhaul.

The terms "backhaul" and "fronthaul" can be used interchangeably in some aspects of the disclosure. A fronthaul is similar to a backhaul, which, at its simplest, links a radio access network to a wired (e.g., cable or optical fiber) network. A fronthaul can comprise a backhaul, or a portion of a backhaul. For example, a fronthaul can comprise a connection between one or more centralized controllers and remote stand-alone radio heads. A fronthaul can connect a central processor to multiple base transceiver stations. A fronthaul connects multiple base transceiver stations together when one or more of the base transceiver stations functions as a central processor. As used herein, a fronthaul may comprise a traditional backhaul network. For example, a fronthaul can comprise at least a portion of S1 and/or X2 interfaces. A fronthaul may be part of a base station network.

In dense BTS deployments, some of the RAN processing can be distributed close to the edge of the RAN edge, such as in the BTSs and/or in hubs that connect BTSs together. Some processing can be performed farther away from the RAN edge, such as closer to and/or within a core network. In some aspects, RAN processing that is sensitive to latency is performed at or near the RAN edge, such as in BTSs 101.1-101.N, whereas processing that is not as sensitive to latency can be performed farther away from the RAN edge, such as central processor 110 and/or a distributed computing system in a data center.

In one aspect of the disclosure, the RAN processing system 111 comprises a distributed computing system configured to coordinate a plurality of physical processors (which may be centrally located or geographically distributed), such as to perform joint processing. In some aspects, the plurality of physical processors can be represented as processors 111.1-111.N. In other aspects, virtual processors (such as virtual base stations implemented as software-defined radios (SDRs)) can be represented as processors 111.1-111.N.

By way of example, but without limitation, physical processors in a distributed computing environment can be represented as processors 111.1-111.N. As used herein, the term "processor" can refer to a computer processor, a computer, a server, a central processing unit (CPU), a core, a microprocessor, and/or other terminology that indicates electronic circuitry configurable for carrying out instructions of a computer program. In some aspects, a processor comprises geographically distributed computing elements (e.g., memories, processing cores, switches, ports, and/or other computing or network resources). A fronthaul and/or backhaul network communicatively coupling the geographically distributed computing elements can function as a computer bus.

The processors are communicatively coupled together via at least one network, such as a backhaul network 115. The backhaul network 115 can comprise an optical fiber network, a wireline network (e.g., Ethernet or other cable links), a wireless network, or any combination thereof. In some aspects, the backhaul network 115 can comprise the RAN, the Internet, and/or one or more network fabrics (including terrestrial network fabrics, airborne network fabrics, space network fabrics, and combinations thereof). In one aspect, each of N processors is programmed to function as one of a plurality N of virtual base stations 111.1-111.N. In another aspect, each virtual base station 111.1-111.N comprises multiple processing cores. In some aspects, each virtual base station 111.1-111.N represents a hardware abstraction wherein details of how the hardware is implemented are concealed within the representation of each "processor" 111.1-111.N as a single element. In such aspects, the physical implementation of each processor 111.1-111.N can comprise physical computing elements that are geographically distributed and/or physical computing elements that are shared by multiple virtual base stations 111.1-111.N.

Each virtual base station 111.1-111.N can be distributed across a plurality of processors and memories. By way of example, a virtual base station 111.1-111.N can comprise software instructions residing on one or memories near the RAN edge (e.g., on BTS 101.1-101.N) and configured to operate one or more RAN-edge processors. The RAN-edge portion of the virtual base station 111.1-111.N can be configured to perform latency-sensitive RAN processing operations and may include a mobility source-code segment configured to migrate the virtual base station 111.1-111.N portion from one network device to another, such as when its associated UE moves through the network. The virtual base station 111.1-111.N can also comprise software instructions residing on one or memories farther away from the RAN edge (such as near or within the core network) configured to operate one or more processors, such as located in the central processor 110, in a BTS configured to function as a hub or central processor, and/or in a remote data center. The core-portion of the virtual base station 111.1-111.N can be configured to perform RAN processing operations that are less latency-sensitive.

By way of example, each virtual base station 111.1-111.N may comprise one or more of the processors and perform base station processing operations that would ordinarily be performed solely by one of the corresponding base stations 101.1-101.N. Specifically, virtual base stations can be implemented via software that programs general-purpose processors. For example, an SDR platform virtualizes baseband processing equipment, such as modulators, demodulators, multiplexers, demultiplexers, coders, decoders, etc., by replacing such electronic devices with one or more virtual devices, wherein computing tasks perform the functions of each electronic device. In computing, virtualization refers to the act of creating a virtual (rather than actual) version of something, including (but not limited to) a virtual computer hardware platform, operating system (OS), storage device, or computer network resources.

In accordance with the art of distributed computing, a virtual base station's functions can be implemented across multiple ones of the plurality of processors. For example, workloads may be distributed across multiple processor cores. In some aspects, functions for more than one base station are performed by one of the processors.

As used herein, distributed computing refers to the use of distributed systems to solve computational problems. In distributed computing, a problem is divided into multiple tasks, and the tasks are solved by multiple computers which communicate with each other via message passing. A computer program that runs in a distributed system is referred to as a distributed program. An algorithm that is processed by multiple constituent components of a distributed system is referred to as a distributed algorithm. In a distributed computing system, there are several autonomous computational entities, each of which has its own local memory.

In accordance with aspects of the disclosure, the computational entities (which are typically referred to as computers, processors, cores, CPUs, nodes, etc.) can be geographically distributed and communicate with each other via message passing. In some aspects, message passing is performed on a fronthaul and/or backhaul network. The distributed computing system can consist of different types of computers and network links, and the system (e.g., network topology, network latency, number of computers, etc.) may change during the execution of a distributed program. In one aspect, a distributed computing system is configured to solve a computational problem. In another aspect, a distributed computing system is configured to coordinate and schedule the use of shared communication resources between network devices. In some aspects, the virtual base stations 111.1-111.N are implemented as middleware, each residing on one or more network devices, and in some cases, each distributed across multiple network devices for accessing either or both RAN-edge services and core services. Such implementations can comprise "fluid" middleware, as the virtual base stations 111.1-111.N (or at least the distributed components thereof) can migrate from one network device to another, such as to reduce latency, balance processing loads, relieve network congestion, and/or to effect other performance and/or operational objectives.

A distributed computing system can comprise a grid computing system (e.g., a collection of computer resources from multiple locations configured to reach a common goal, which may be referred to as a super virtual computer). In some aspects, a distributed computing system comprises a computer cluster which relies on centralized management that makes the nodes available as orchestrated shared servers. In some aspects, a distributed computing system comprises a peer-to-peer computing system wherein computing and/or networking comprises a distributed application architecture that partitions tasks and/or workloads between peers. In some aspects, peers are equally privileged, equipotent participants in the application. They are said to form a peer-to-peer network of nodes. Peers make a portion of their resources, such as processing power, disk storage, network bandwidth, etc., available to other network participants without the need for central coordination by servers or stable hosts. Peers can be either or both suppliers and consumers of resources. Distributed computing includes Cloud computing.

In some aspects, the central processor resides at the edge of the RAN network. The central processor 110 can provide for base-station functionality, such as power control, code assignments, and synchronization. The central processor 110 may perform network load balancing (e.g., scheduling RAN resources), including providing for balancing transmission power, bandwidth, and/or processing requirements across the radio network. Centralizing the processing resources (i.e., pooling those resources) facilitates management of the system, and implementing the processing by employing multiple processors configured to work together (such as disclosed in the '163 application) enables a scalable system of multiple independent computing devices, wherein idle computing resources can be allocated and used more efficiently. In some aspects, a portion of the central processor resides at the edge(s) of the RAN and a portion resides in at least one remote location (such as a data center). RAN processing tasks can be partitioned based on latency sensitivity such that latency-sensitive tasks are assigned to edge computing resources and tasks that are not as latency-sensitive are assigned to remote computing resources.

In some aspects, base-station functionality is controlled by individual base transceiver stations and/or UEs assigned to act as base stations. RAN processing (such as, but not limited to, array processing) may be performed in a distributed sense wherein channel estimation, weight calculation, and optionally, other network processing functions (such as load balancing) are computed by a plurality of geographically separated processors. In some aspects, access points and/or subscriber units are configured to work together to perform computational processing. A central processor (such as central processor 110) may optionally control data flow and processing assignments throughout the network. In such aspects, the virtual base stations 111.1-111.N (or components thereof) can reside on UEs, relays, and/or other RAN devices.

Distributed virtual base stations 111.1-111.N can reduce fronthaul requirements by implementing at least some of the Physical Layer processing at the base transceiver stations 101.1-101.N while implementing other processing (e.g., higher layer processing, or the higher layer processing plus some of the Physical layer processing) at the central processor 110. In some aspects of the disclosure, one or more of the base transceiver stations 101.1-101.N depicted in the figures may be replaced by UEs adapted to perform as routers, repeaters, and/or elements of an antenna array.

In one aspect of the disclosure, the base station network comprising base transceiver stations 101.1-101.N is adapted to operate as an antenna array for MIMO subspace processing in the RAN. In such aspects, a portion of the network may be adapted to serve each particular UE. The SDRs (represented as the virtual base stations 111.1-111.N) can be configured to perform the RAN baseband processing. Based on the active UEs in the RAN and the standard(s) they use for their wireless links, the SDRs can instantiate virtual base station processes in software, each process configured to perform the baseband processing that supports the standard(s) of its associated UE(s) while utilizing a set of the base transceiver stations within range of the UE(s).

In accordance with one aspect of the disclosure, baseband waveforms comprising RAN channel measurements and/or estimates (such as collected by either or both the UEs and the base transceiver stations) are processed by the SDRs (such as in a Spatial Multiplexing/Demultiplexing module (not shown)) using Cooperative-MIMO subspace processing to produce pre-coded waveforms. A routing module (not shown) sends the pre-coded waveforms over the fronthaul 105 to multiple ones of the base transceiver stations 101.1-101.N, and optionally, to specific antennas 102.1-102.$M_1$, 103.1-103.$M_2$, . . . , 104.1-104.$M_N$. The base transceiver stations 101.1-101.N can be coordinated to concurrently transmit the pre-coded waveforms such that the transmitted waveforms propagate through the environment and constructively interfere with each other at the exact location of each UE 120.1-120.K.

In one aspect, the super-array processing system 111 configures complex-weighted transmissions 122, 123, and 124 from the geographically distributed base transceiver station 101.1, 101.2, and 101.N, respectively to exploit the rich scattering environment in a manner that focuses low-power scattered transmissions to produce a concentrated high-power, highly localized signal (e.g., coherence zones 125.1, 125.2, . . . , 125.K) at each UE's 120.1-120.K antenna system 121.1, 121.2, . . . , 121.K, respectively. The coherent combining of the transmitted waveforms at the location of each UE 120.1-120.K can result in the synthesis of the baseband waveform that had been output by the SDR instance associated with that particular UE 120.1-120.K. Thus, all of the UEs 120.1-120.K receive their own respective waveforms within their own synthesized coherence zone concurrently and in the same spectrum.

In accordance with one aspect of the invention, each UE's corresponding synthesized coherence zone comprises a volume that is approximately a carrier wavelength or less in width and centered at or near each antenna on the UE. This can enable frequency reuse between nearby—even co-located—UEs. Spatial Multiplexing/Demultiplexing can be configured to perform maximum ratio processing. Any of various algorithms for MIMO processing disclosed in the incorporated references may be employed by methods and apparatus aspects disclosed herein. Some aspects can comprise zero forcing, such as to produce one or more interference nulls, such as to reduce interference from transmissions at a UE that is not an intended recipient of the transmission. By way of example, but without limitation, zero forcing may be performed when there are a small number of actual transmitters (e.g., base transceiver station antennas) and/or effective transmitter sources (e.g., scatterers in the propagation environment).

In alternative aspects, at least one of the BTSs is configured to transmit downlink signals without spatial precoding. In such cases, the UEs receiving such downlink transmissions might be configured to perform spatial processing.

By way of example, some aspects of the disclosure configure the UEs 120.1-120.K to form a cluster in which the individual UEs 120.1-120.K are communicatively coupled together via a client device fronthaul network 102, which can comprise any of various types of local area wireless networks, including (but not limited to) wireless personal area networks, wireless local area networks, short-range UWB networks, wireless optical networks, and/or other types of wireless networks. In some aspects, since the bandwidth of the client device fronthaul network 102 is typically much greater than that of the WWAN, a UE 120.1-120.K can share its access to the RAN (i.e., its WWAN spatial subchannel, or coherence zone) with other UEs 120.1-120.K in the cluster, thus enabling each UE 120.1-120.K to enjoy up to a K-fold increase in instantaneous data bandwidth.

In some aspects, a cluster of UEs can perform cooperative subspace demultiplexing. In some aspects, the cluster can perform cooperative subspace multiplexing by coordinating weighted (i.e., pre-coded) transmissions to produce localized coherence zones at other clusters and/or at the base transceiver stations 101.1-101.N. In some aspects, the UEs 120.1-120.K comprise a distributed computing platform configured to perform distributed processing (and optionally, other cloud-based services). Distributed processing may be performed for Cooperative-MIMO, other various SDR functions, and/or any of various network control and management functions.

Thus, each UE may comprise a distributed SDR, herein referred to as a distributed UE SDR. Components of the distributed UE SDR can reside on multiple network devices, including UEs, relays, BTSs, access points, gateways, routers, and/or other network devices. Components of the distributed UE SDR can be communicatively coupled together by any combination of a WPAN (such as may be used for connecting an ecosystem of personal devices to a UE), a peer-to-peer network connecting UEs together and possibly other devices, a WLAN (which may connect UEs to an access point, router, hub, etc.), and at least one WWAN. In some aspects, distributed UE SDR components can reside on a server connected via a gateway or access point. In some aspects, distributed UE SDR components can reside on one or more BTSs, WWAN hubs, WWAN relays, and central processors, and/or on network devices in the core network.

Figure 2A:
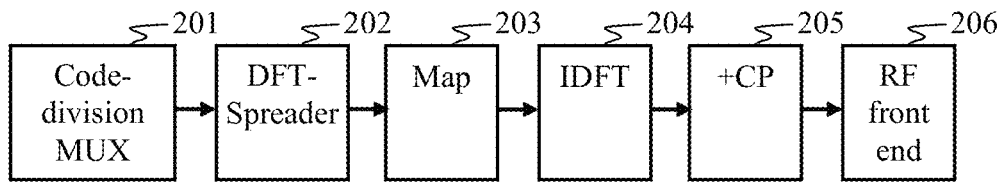
FIG. 2A is a block diagram of a transmitter apparatus according to aspects of the disclosure.

Transmitter apparatuses are proposed according to some aspects of the disclosure as schematically shown in FIG. 2A, such as may be used in the downlink transmission system comprising the BTSs 101.1-101.N as shown in FIG. 1. Such a transmitter apparatus comprises a code division multiplexer 201 having signal inputs for receiving original data symbols (e.g., comprising separate user-data streams) to be transmitted in a plurality of code division multiple-access channels employing the same set of subcarriers in a shared WWAN radio access (e.g., a RAN downlink) channel. The code division multiple-access channels may be received and de-multiplexed by each of a plurality of UEs. The multiplexer 201 may also have a signal input for control information to be transmitted in the downlink channel. The multiplexer 201 maps each original data symbol (and optionally, may include control information symbols) to a spread-DFT code (e.g., codeword). The codes may comprise orthogonal codes, quasi-orthogonal codes, or some combination thereof. In aspects disclosed herein, the multiplexer 201 can be operable to multiplex each of a plurality of data streams into a different one of a plurality of spread-DFT code division multiple-access channels.

In one aspect, the multiplexer 201 can assign a different codeword set to each data stream to be transmitted. A codeword set can comprise one or more spread-DFT codes, and each set can comprise a different code division multiple access channel. For example, each data symbol is mapped to one of the DFT codewords in its stream's assigned multiple-access codeword set (e.g., channel). This enables each SC-FDMA symbol generated therefrom to comprise a plurality of code-division multiple-access channels while providing a low-PAPR OFDM transmission signal. An SC-FDMA symbol is sometimes described as containing N sub-symbols that represent the modulating data. In LTE, the OFDMA (downlink) and SC-FDMA (uplink) symbol lengths are both 66.7 μs. In aspects of the disclosure, SC-FDMA coding is adapted so it can be implemented in the downlink. In some aspects of the disclosure, a downlink SC-FDMA symbol comprises N spread-DFT symbols, wherein an N-point DFT (which may be implemented using an FFT) is employed for generating the spread-DFT symbols.

A DFT spreader 202 spreads the original data symbols (and optionally, each control information symbol) into spread data symbols. A mapper 203 maps the spread data symbols to OFDM subcarriers (and optionally, to antennas), such as to input bins of an oversampled inverse discrete Fourier transform (IDFT) 204, which is typically implemented as an oversampled fast transform (e.g., an FFT). To provide the low-PAPR characteristics of the OFDM transmission signal, the spread-DFT symbols can be mapped to contiguous or non-contiguous (but evenly spaced) subcarriers. The spread-OFDM signal output from the IDFT 204 is prepended with a cyclic prefix (in "+CP" circuit 205) before up-conversion to RF and amplification in an RF transmitter (e.g., RF front-end) 206.

In spread-OFDM, N subcarriers can be shared by every original data symbol in a block of up to N original data symbols if the spreading codes are configured to be orthogonal. The spreader 202 enables the N subcarriers to be shared by a block of up to N original data symbols, which the multiplexer 201 selects from the user data and which can comprise multiple UE transport blocks.

In one aspect, the function of the spreader 202 can be explained as follows. Each original data symbol of the block is replicated into N parallel copies. Each copy is then multiplied by a code chip from a corresponding spreading signature. A spreading signature can comprise a row or column of a DFT-based spreading matrix, and may be referred to as a spreading code, a codeword, or a code space. The products are summed such that each sum (referred to as a spread data symbol) comprises one of N linear combinations of the original data symbols, wherein the coefficients are the code chips (e.g., a row or column of a corresponding spreading matrix), and the unknowns are the original data symbols. Each spread data symbol is modulated onto a different one of the N subcarriers, all of which are to be transmitted in parallel. Each SC-FDMA symbol comprises N spread data symbols. Thus, the multiplexer 201 operates in conjunction with the spreader 202 to map data symbols from a plurality of data streams (intended for different destination devices) into each SC-FDMA symbol, thereby providing an OFDM multiple-access signal that has low PAPR.

The usual implementation of OFDM calls for the IDFT 204 to convert the parallel chips into serial form for transmission. In OFDM, the IDFT 204 is typically implemented via oversampling, so the input symbol block to the IDFT 204 is typically zero-padded, since zero padding in one domain (e.g., time or frequency) results in an increased sampling rate in the other domain (e.g., frequency or time). The cyclic prefix is appended to remove the interference between successive symbols and to accommodate the circulant convolution provided by the FFT.

In some aspects, the multiplexer 201 can comprise a physical memory storage, such as a data buffer configured to temporarily store data before it is input to the DFT spreader 202. The data can be stored in the buffer as multiple data streams are retrieved from an input device (e.g., one or more data sources, which are not shown) and/or before it is sent to an output device (e.g., the DFT spreader 202). The data stored in a data buffer is stored on a physical storage medium. Buffers can be implemented in software, and typically use RAM to store temporary data due to the much faster access time compared with hard disk drives. The multiplexer 201 can employ a cache, which can function as a buffer. The multiplexer 201 can comprise non-transitory computer-readable memory with instructions stored thereon and configured to operate a processor to order, group, or otherwise arrange the data in the buffer (or cache) to multiplex each of the data streams into a different one of a plurality of spread-DFT code division multiple-access channels. An integrated circuit or other circuits might be designed to provide this functionality. The multiplexer 201 may comprise or be communicatively coupled to a scheduler (not shown) that assigns each data stream to a multiple-access code space. The multiplexer 201 then arranges the data such that when it is partitioned into length-N blocks by the DFT spreader 202, data from each stream is mapped to the code set of its assigned multiple-access channel.

The DFT spreader 202 can implement an FFT algorithm that computes the DFT of an input sequence received from the multiplexer 201. FFT algorithms are well-known in the art and include the Cooley-Tukey algorithm, Prime-factor FFT algorithm, Bruun's FFT algorithm, Rader's FFT algorithm, Bluestein's FFT algorithm, and Hexagonal Fast Fourier Transform. Other FFT algorithms may be employed. A serial-to-parallel converter may convert a received data sequence into parallel inputs. The DFT spreader 202 can comprise an input data partitioner to partition input data into blocks of N data symbols. The DFT spreader 202 can be implemented by an integrated circuit, for example. In some aspects, the DFT spreader 202 can comprise non-transitory computer-readable memory with instructions stored thereon and configured to operate a processor to perform the spreading.

The mapper 203 can comprise a combination of physical memory storage (such as a buffer) and a data transit mechanism (such as a serial-to-parallel converter, a parallel-to-serial converter, a switching array, etc.) to effect the mapping of symbols output from the DFT spreader 202 to inputs of the IDFT 204. For example, the mapper 203 may employ a serial-to-parallel converter to convert a serial data stream into parallel inputs to the IDFT 204, and the mapper 203 may further comprise a zero-insertion algorithm or circuit to insert zero values into the serial data stream according to scheduling information (such as resource block assignments for a predetermined set of UEs). The mapper 203 can comprise a data insertion module for receiving control symbols (including reference symbols) to be mapped to predetermined subcarriers. The mapper 203 can be implemented in an integrated circuit. In some aspects, the mapper 203 can comprise non-transitory computer-readable memory with instructions stored thereon and configured to operate a processor to perform the spreading.

IDFT 204 can be implemented via circuits and processors typically employed in OFDM. The IDFT 204 can be implemented via an FFT and can employ zero padding. A parallel-to-serial conversion can provide the output OFDM transmission signal.

In some aspects, a PAPR-mitigation processor may process the data symbols prior to input to the multiplexer 201. For example, aspects of the disclosure can be configured to employ a first set of spreading codes (such as orthogonal and/or quasi-orthogonal spreading codes) designed to spread original data symbols to produce first spread data symbols. The first spreading codes may be configured to produce first spread data symbols with lower PAPR than the original data. The multiplexer 201 might comprise a first spreader (not shown) to perform such first spreading. Alternatively, the first spreader (not shown) might be implemented before the multiplexer 201 or in place of the multiplexer 201. The first spreader (not shown) can be configured to spread each stream's data symbols separately from the other stream(s). The first spread data symbols are subsequently spread with DFT-based codes by DFT spreader 202 to produce second spread data symbols, which are subsequently mapped to OFDM resource blocks by mapper 203 and then modulated onto OFDM subcarriers by IDFT 204. A corresponding receiver according to this aspect can demodulate the received signals (e.g., via a DFT), optionally equalize the demodulated signal (e.g., via a frequency-domain equalizer), de-map the resulting symbols (e.g., via a de-mapper, and possibly a scheduler), perform DFT de-spreading (e.g., via a de-multiplexer decoder comprising a DFT de-spreader, and possibly a de-multiplexer configured to provide the DFT de-spreader with de-spreading codes corresponding to the receiver's multiple-access channel(s)), and perform second de-spreading of the resulting DFT-despread (and possibly de-multiplexed) symbols (e.g., by a second de-spreader or a baseband data processor comprising a second de-spreader).

Figure 3A:
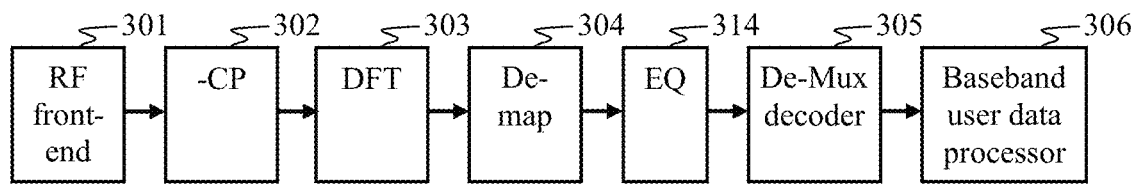
FIG. 3A is a block diagram of a receiver apparatus according to aspects of the disclosure.

In a receiver configured to receive spread-OFDM signals (such as the receiver block diagram depicted in FIG. 3A), a received spread-OFDM transmission is filtered, converted to baseband, and digitized by an RF receiver, such as RF front-end 301, and then the cyclic prefix is removed (such as by a cyclic prefix removal circuit 302 or some equivalent) from the digitized baseband signal. The receiver can comprise up to N matched filters, which can be implemented in the discrete baseband domain, such as by performing a DFT 303. Specific output values from the DFT 303 may be selected by a de-mapper 304 corresponding to subcarriers allocated by a scheduler (not shown) to the UE(s), for example. The output of the DFT 303 has the form of the transmitted signal multiplied by a diagonal channel matrix whose diagonal values are flat-fading coefficients, which allows for simple equalization 314. The IDFT 204 and DFT 303 operations and the role of the cyclic prefix are implicitly absorbed through the diagonal structure of the channel response. Thus, aspects of the disclosure can provide for configuring the spreader 202 to provide various benefits, including (but not limited to) orthogonal coding, enabling use of a fast-transform algorithm, and shaping the transmitted OFDM signal to have low PAPR.

In accordance with some aspects of the disclosure, a processor-based transceiver can include a non-transitory computer-readable memory with instructions stored thereon and configured to perform any of the algorithms disclosed herein. In reference to the spreader 202, by way of example, each original data symbol in a length-N block can be multiplied by a complex-valued spreading code, such as via a matrix multiplication or equivalent operation. For example, a $j^{th}$ original data symbol $d_j$ is multiplied by a $j^{th}$ column vector of an N×N spreading matrix S, where the $j^{th}$ column vector corresponds to the spreading code for symbol $d_j$, and N (which equals the number of subcarriers onto which the spread data is modulated) corresponds to the bandwidth expansion factor (e.g., spreading gain) to produce a $j^{th}$ spread data-symbol vector. The multiplexer 201 (which may be in communication with a scheduler) can select user data for different UEs (and optionally, control information symbols) and arrange the selected data to produce the length-N block of input data symbols to the spreader 202, thus providing for code division multiplexing (e.g., code division multiple access). Thus, the multiplexer 201 can map each user data stream to a spread-DFT code set assigned by the scheduler to the corresponding UE. The N different spread data vectors are summed to produce a vector of spread data symbols (of length N) before serial-to-parallel conversion, zero insertion (e.g., zero padding), and processing by the IDFT 204. It should be appreciated that if fewer than N original data symbols (e.g., n<N) are in the input block, then N−n of the symbols in the block may be set to zero while still producing a length-N vector of spread data symbols.

Figure 2B:
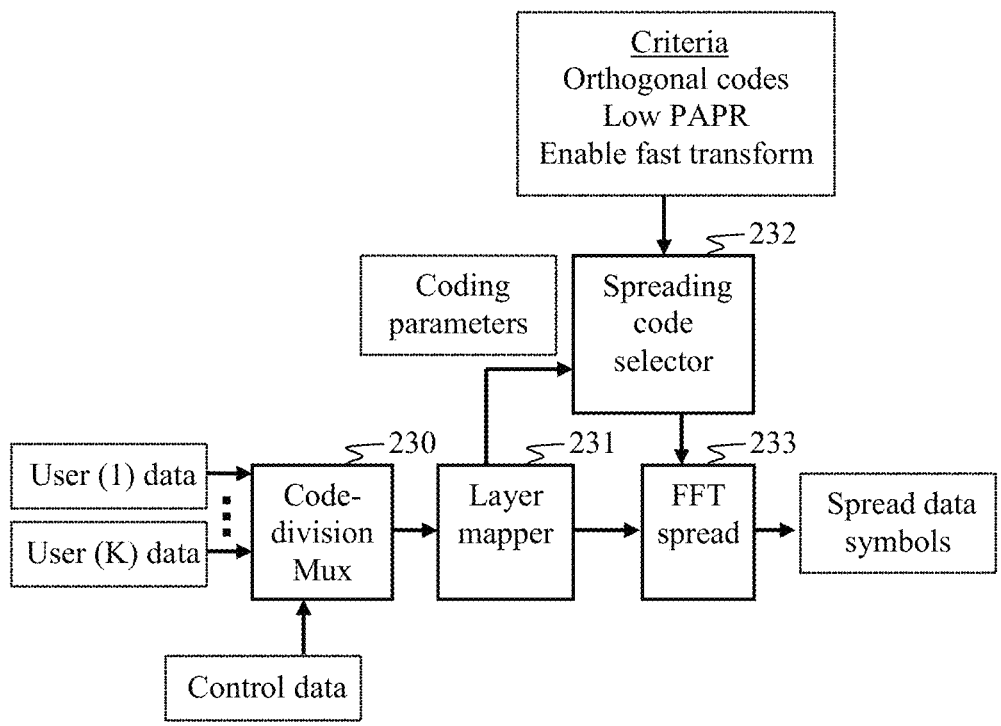
FIG. 2B is a block diagram of a DFT spreader (such as can be employed as spreader 202 shown in FIG. 2A) in accordance with some aspects of the disclosure. At least some of the blocks shown herein, such as in FIGS. 2A and 2B can be implemented by special-purpose processors and/or general-purpose processors programmed to perform functions disclosed herein.

FIG. 2B is a block diagram of a DFT spreader in accordance with some aspects of the disclosure. A code-division multiplexer 230 receives scheduling information and/or generates scheduling information that comprises an assignment of each user-data streams (and optionally, control information data) to a code set (e.g., one or more codewords) generated by the spreader 233. Layer mapper 231 is optionally provided, which is responsive to scheduling information to assign data symbols to different layers, which can be mapped to corresponding transmit antennas. This may be performed by one or more BTSs, remote radio heads, relays, access points, etc., for downlink transmissions. In some aspects, this may be performed for uplink transmissions. Layer mapper 231 might be configured to map different user data (and optionally, control information data) to different time slots in the downlink transmissions. Spreading code selector 232 obtains coding parameters, such as subcarrier information (e.g., number of subcarriers N, subcarrier spacing, and/or the like), time-slot information, and/or layer information, which can be used to select or adapt spreading performed by spreader 233.

The spreading code selector 232 can be configured to select spreading codes corresponding to criteria, such as code-space orthogonality (e.g., orthogonal and/or quasi-orthogonal spreading codes), PAPR criteria, and/or enabling a fast transform operation for code generation and/or for encoding original data symbols. Responsive to the number of assigned uplink subcarriers (for example), the selector 232 can select a set of orthogonal complex spreading codes, whereas the multiplexer 230 can assign each data symbol to one (or more) of the spreading codes. Orthogonal functions (e.g., signals or sequences) have zero cross-correlation. Zero correlation occurs if the product of two signals summed over a period of time (or sequence length) is zero. A set of signals or sequences in which all have zero cross-correlation with each other constitutes an orthogonal code space(s).

Other criteria may be employed. For example, a criterion which relates to pulse shaping (e.g., time-domain and/or frequency-domain shaping, or windowing) can further reduce PAPR by sacrificing some bandwidth efficiency. In one aspect, a mask (e.g., a spectral mask) may be applied to the subcarriers, such as by way of the coding or directly following the coding, in order to shape the spread-OFDM signal, such as to provide for pulse shaping.

In one aspect, spreading is achieved via a fast transform operation (such as FFT spreader 233). The FFT spreader's 233 input parameters can be controlled by the spreading code selector 232 in accordance with the criteria and/or coding parameters. In one aspect, FFT spreader 233 parameters, such as FFT size, input data block size, input symbol order, etc., can be controlled by the spreading code selector 232. In some aspects, the selector 232 can select how a fast transform is performed, such as by directly controlling the transform's operations or by indirectly controlling the transform via FFT size, and the like.

In one aspect, responsive to an assignment of N OFDM subcarriers, the selector 232 selects an orthogonal N×N complex spreading matrix that comprises DFT coefficients. Some matrices comprising DFT coefficients are not orthogonal. While it is well known that some orthogonal functions can be generated or expanded using various algorithms, such as a seed algorithm or some other recursive technique, some of these algorithms do not provide codes with desirable features, such as orthogonality and low PAPR. For example, an N×N spreading matrix constructed by concatenating rows or columns of an N/2×N/2 DFT spreading matrix can yield fewer than N orthogonal spreading codes. Similar deficiencies result from concatenations and other combinations of different-size DFT matrices, permutations of DFT matrices, punctured DFT matrices, truncated DFT matrices, and the like. Thus, in some aspects, the selector 232 advantageously provisions an N×N spreading matrix (or corresponding set of complex codes) to provide for N orthogonal spreading codes. This can be referred to as an orthogonal code space with dimension N.

In some aspects of the disclosure, the selector 232 can provide for orthogonally spreading a block of up to N original data symbols with DFT-based complex spreading codes to produce a length-N vector of spread data symbols. In other aspects, the selector 232 can employ complex spreading codes to spread N'>N original data symbols onto N subcarriers. While these complex spreading codes are not all orthogonal, the codes can be configured to have low cross correlation. Various techniques may be employed to select a code set having optimal features, such as low cross correlation, low PAPR, or a combination thereof. In some aspects, at least some of the spreading codes can be orthogonal to each other.

Figure 3B:
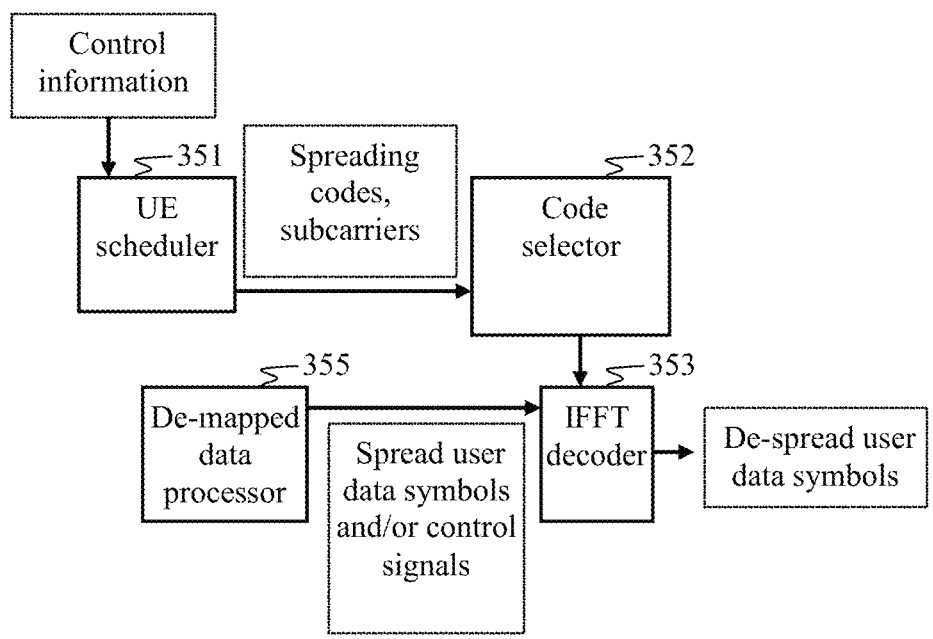
FIG. 3B is a block diagram that depicts a portion of a receiver, such as a receiver that may be employed in a UE.

FIG. 3B is a block diagram that depicts a portion of a receiver, such as a receiver that may be employed in a UE. In one aspect, the decoder 305 comprises the system shown in FIG. 3B. A code selector 352 can process subcarrier parameters corresponding to the received spread-OFDM signal to control decoder 353. The code selector 352 can be responsive to the spreading code(s) assigned to the UE by a scheduler and provide for a corresponding code set to enable decoder 353 to decode the UE's spread data. The decoder 353 can employ a fast transform, such as an IFFT, to de-spread the spread data symbols and produce de-spread data symbols, which may be output for further processing. A digital baseband input representing the received downlink signal is provided by processor 355 to the decoder 353. In one aspect, processor 355 can provide spread data symbols comprising spread user data symbols, spread control signals, or both to the decoder 353. The de-mapped data processor 355 may be part of the de-mapper 304, or it may be part of the decoder 305. Since the server side of the WWAN can schedule the downlink OFDM subcarriers and codes used by each UE, the spreading code and subcarrier parameters can be retrieved from a UE scheduler 351 that receives control information in the downlink. The UE scheduler 351 can be responsive to scheduling information transmitted in the RAN downlink to control the demapper 355 (e.g., for OFDM subcarrier selection) and the code selector 352 (e.g., for code-space selection).

In accordance with one aspect of the disclosure, as depicted in FIG. 4A, a method performed in a radio transceiver is provided, which can employ SC-FDMA to produce a multiple-access OFDM transmission signal with reduced PAPR. In some aspects, the method depicted in FIG. 4A (as well as any of the methods throughout this disclosure) comprises functional steps implemented via software instructions operable to cause a processor (such as a general-purpose processor) to execute the steps in a process which produces a spread-OFDM signal. In some aspects, one or more of the functional steps are embodied in hardware, such as circuits.

By way of example, application-specific integrated circuits (ASICs), field-programmable gate arrays (FPGAs), and/or other circuits can be provided as embodying one or more of the functional steps disclosed throughout the specification and depicted in the drawings. In some aspects, multiple ones of the functional steps can be implemented by a common processor or circuit. For example, certain efficiencies might be achieved by configuring multiple functional steps to employ a common algorithm (such as an FFT and/or some other algorithm), thereby enabling a circuit, a processor, or some other hardware component to be used for different functions, and/or enabling software instructions to be shared for the different functions.

With respect to FIG. 4A, an eNodeB receives a Channel quality indicator (CQI) and Buffer Status Reports (BSRs) from each UE 401. Each UE may compute its CQI value from downlink channel and send it to the eNodeB. CQI is a four digit value sent as a feedback for the downlink channel. The CQI informs the eNodeB about the channel quality in the downlink. This helps the eNodeB to allocate proper Modulation and Coding Scheme (MCS) and PRB (Physical Resource Block) for the UE. A BSR indicates to the network that a UE has certain data in its buffer and requires resource grants to send this data.

The eNodeB sends MCS, PRB mapping, and code assignment(s) to each UE 402. Based on BSR, CQI, and UE Quality of Service (QoS), the eNodeB computes the MCS value and PRB mapping information and sends it to the UE in the downlink. QOS defines how a particular user data should be treated in the network. QoS is implemented between the UE and PDN Gateway and is applied to a set of bearers. For example, VoIP packets are prioritized by the network compared to web browser traffic. Other factors, such as traffic volume and radio conditions can affect scheduling. Additionally, code assignments for each of the UEs can be computed and broadcast.

In some aspects of the disclosure, the eNodeB groups UEs having similar modulation schemes into the same PRB 403. In some cases, UE data streams having different modulation orders are mapped to the same PRB. In such cases, the eNodeB can group UE data streams in the same PRB according to modulation order such that a first grouping contains UE data streams having a first modulation order (e.g., QPSK), a second grouping contains UE data streams having a second modulation order (e.g., 16-QAM), and a third grouping contains UE data streams having a third modulation order (e.g., 64-QAM).

In some aspects, each UE transmission signal is provided with one of a set of different scaling factors by the eNodeB. Such scaling factors can adapt the transmit power of the downlink signal to each UE. In such cases, the eNodeB can group UE data streams into the same PRB according to modulation order and scaling factor such that each grouping comprises a plurality of UE data streams with both similar modulation order and scaling factor. A scheduler coupled to the code-division multiplexer can perform such groupings described herein. Each of a plurality of different PRBs may be assigned to a different layer and/or the corresponding OFDM signals amplified by a different power amplifier.

A code-division multiplexer in the eNodeB assigns a multiple access spreading code set to each of a plurality of UE data streams in a grouping to multiplex the streams in the downlink channel 404. The spreading code set can correspond to one or more spreading codes in a single SC-FDMA symbol interval or in multiple SC-FDMA symbol intervals. Multiple SC-FDMA symbol intervals can comprise a block of consecutive symbol intervals and/or non-consecutive symbol intervals, such as interleaved symbol intervals. In one example, the code-division multiplexer combines data symbols from different UE data streams in a grouping to produce one or more length-N blocks of multiplexed UE data symbols, where N is the number of OFDM subcarriers in the grouping's PRB.

The position of each data symbol in the block determines the code assigned to it. In some aspects, data symbols for each user are grouped together in the block. In some aspects, data symbols for different users are interleaved in the block. The number of a UE's data symbols in each block can be selected by the code-division multiplexer based on the downlink data rate scheduled for serving the UE. In some aspects, additional symbols can be inserted into the block. For example, symbol insertion of repeated symbols or dummy symbols may be performed by the code-division multiplexer to ensure a low-PAPR signal is amplified by the eNodeB. In some aspects, control-information symbols are assigned to one or more blocks. In some aspects, the code-division multiplexer schedules a time slot comprising consecutive SC-FDMA symbol intervals comprising original UE data symbols having the same modulation order, and possibly the same (or similar) scaling factor. In other aspects, the code-division multiplexer schedules each block to one of a plurality of layers according to the block's modulation order (and, optionally, scaling factor). Each layer might be directed to a different antenna or to a different power amplifier, for example.

A DFT-spreader (e.g., a SC-FDMA spreader) spreads each data symbol with its assigned code 405. A length-N block of spread symbols is generated for each input length-N block of data symbols, for example. A resource mapper maps each block of spread symbols to its corresponding PRB subcarriers 406, such as frequency bins of an IFFT. Then each block of spread symbols is modulated onto its corresponding OFDM subcarriers 407. Additional processing, such as appending a cyclic-prefix (not shown), may follow.

FIG. 4B is a flow diagram that can be employed in accordance with various aspects of the disclosure, such as for processing received spread-OFDM signals. In one aspect, for example, the method depicted in FIG. 4B is performed by a UE operating on received downlink signals.

The UE transmits CQI and BSRs to one or more eNodeBs 411 and receives MCS, PRB mapping, and one or more code assignments 412 in response. Downlink user data transmissions are received and processed to produce a digital baseband signal 413. The baseband OFDM signal is demodulated 414 (e.g., by an FFT) based on the PRB assigned to the UE, and the resulting measurement on each OFDM subcarrier may be equalized 416 based on CSI. Then the equalized signal is decoded 417 based on the UE's assigned DFT-based code set, the UE's code set comprising a subset of the DFT codes (e.g., the full DFT code set) employed by the eNodeB(s) to encode the PRB.

Figure 5:
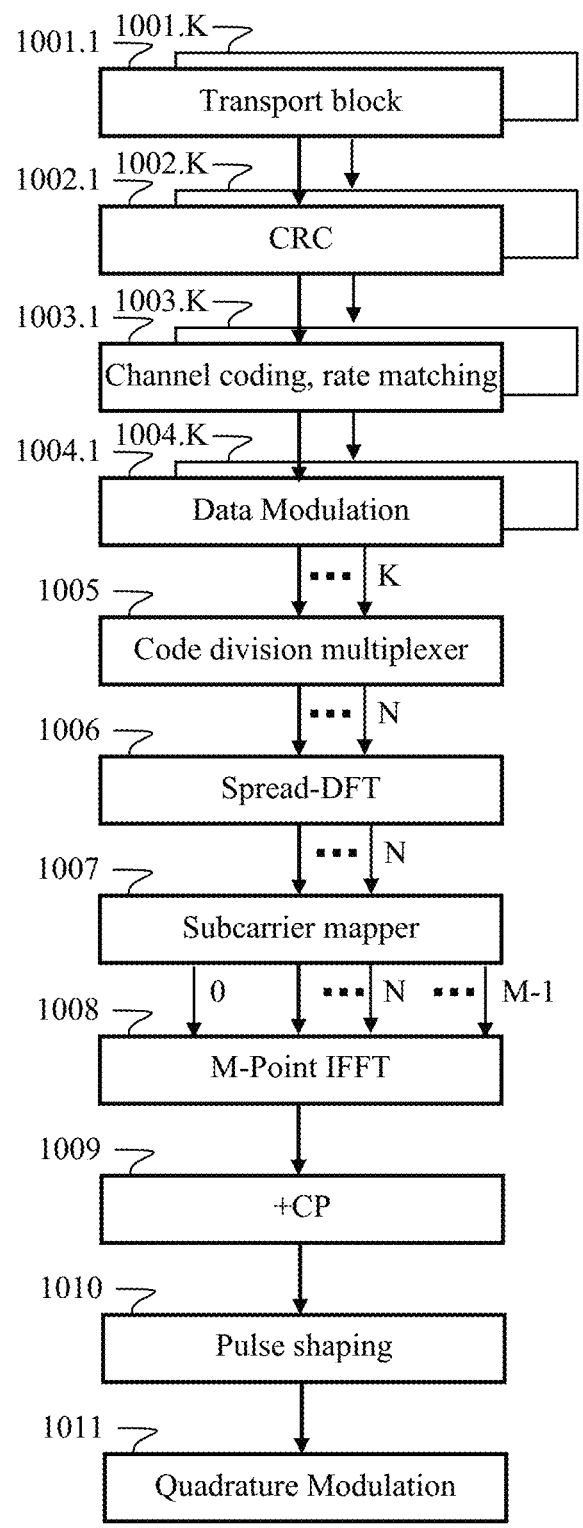
FIG. 5 is a flow diagram that illustrates a method that can be used for generating a downlink shared channel (DL-SCH) transmission in accordance with aspects of the disclosure.

FIG. 5 is a flow diagram that illustrates a method for processing a downlink shared channel (DL-SCH) in accordance with aspects of the disclosure. Upper-layer data in the form of transport blocks is the input to the physical layer. At first, transport blocks 1001.1-1001.K for UEs 1-K are each passed through a CRC encoder 1002.1-1002.K, which appends a CRC to the data. A CRC is used for error detection in transport blocks.

Each data block is then turbo coded 1003.1-1003.K. Turbo coding is a form of concatenated coding, consisting of two convolutional encoders with certain interleaving between them. Rate matching 1003.1-1003.K acts as rate coordinator between preceding and succeeding blocks. The rate matching block creates an output bit stream with a desired code rate. Scrambling (not shown) may follow channel coding/rate matching to produce a block of scrambled bits from the input bits according to a scrambling sequence. Modulation mapping 1004.1-1004.K maps input bit values to complex-valued modulation symbols according to a modulation scheme. Exemplary modulation schemes include, but are not limited to, QPSK, 16QAM, and 64QAM.

Although not shown, layer mapping splits the data sequence into a number of layers. The terms "layer" and "stream" are sometimes used interchangeably. For MIMO, at least two layers are used. The number of layers is typically less than or equal to the number of antennas. Depending on the channel information available at the eNodeB, the modulation and the precoding of the layers may be different to equalize the performance. Except for transmission on a single antenna port (in this case, the symbols are directly mapped onto one layer), there can be two types of layer mapping: one for spatial multiplexing and the other for transmit diversity. In spatial multiplexing, the number of layers may be adapted to the transmission rank, such as by means of a Rank Indicator (RI) to the layer mapping. The RI may be fed back from the UE(s). In the case of transmit diversity, the number of layers is usually equal to the number of antenna ports. The number of layers in this case is not related to the transmission rank, as transmit-diversity schemes are typically single-rank transmission schemes.

Optionally, precoding is used for transmission in multi-antenna wireless communications. In conventional single-stream beam forming, the same signal can be emitted from each of the transmit antennas with appropriate weighting (phase and gain) such that the signal power is maximized at the receiver output. Precoding may be performed for diversity, beam steering, or spatial multiplexing. The MIMO channel conditions may favor one layer (data stream) over another. If the base station (eNodeB) is given information about the channel—for example, information sent back from the UE it can add complex cross-coupling to counteract the imbalance in the channel. Eigen beam forming may be performed to modify the transmit signals in order to provide an improved CINR at the output of the channel.

In FIG. 5, K complex-valued modulated-symbol streams corresponding to K UEs are output by the modulation mapping 1004.1-1004.K. A code-division multiplexer 1005 multiplexes the symbol streams together into blocks of length N and assigns a DFT spreading code to each symbol in each block. Each block is then processed by a spreader, such as a spread-DFT processor 1006, which is also referred to as a transform precoder.

In some aspects of the disclosure, a code division multiple-access downlink transmission employing OFDM comprises multiplication between a spreading matrix A and a data vector x in which the number of columns in A equals the number of rows in x. In one example, A is an m×n spreading matrix, and the product of A with the n×1 column vector x is Ax=b, where the spread data b is an m×1 column vector.

$$Ax = \begin{bmatrix} a_{11} & a_{12} & \ldots & a_{1n} \\ a_{21} & a_{22} & \ldots & a_{2n} \\ \vdots & \vdots & \vdots & \vdots \\ a_{m1} & a_{m2} & \ldots & a_{mn} \end{bmatrix} \begin{bmatrix} x_1 \\ x_2 \\ \vdots \\ x_n \end{bmatrix} = \begin{bmatrix} a_{11}x_1 + a_{12}x_2 + \ldots + a_{1n}x_n \\ a_{21}x_1 + a_{22}x_2 + \ldots + a_{2n}x_n \\ \vdots \\ a_{m1}x_1 + a_{m2}x_2 + \ldots + a_{mn}x_n \end{bmatrix}$$

In some aspects, the number of rows in A is configured to provide the number of rows in in the vector b. In some aspects of the disclosure, the spreading matrix A is configured to impart or adapt various properties of the spread data b, such as to provide the downlink transmissions with a low PAPR, adapt to the number of used subcarriers, and/or adapt to the number of layers.

In one aspect of the disclosure, data vector x is configured to comprise downlink user data corresponding to different UEs. The data vector x can further comprise information corresponding to downlink control. In some aspects, user data and/or control information are selected in order to group symbols in the data vector x with the same modulation order. In some aspects, both modulation order and scaling factors are used as a basis for grouping. This can be performed for various reasons, including providing the downlink transmissions with a low PAPR.

In some aspects, one or more of the columns of spreading matrix A are selected to provide a set of spreading codes for each user. A separate code set can be employed for control information. Orthogonal codes can provide for a code division multiple access scheme to allow multiple users to share the same subcarriers.

In one implementation, a first orthogonal spreading matrix $A_1$ is provided for spreading a first downlink user data vector (e.g., data $x_1$) corresponding to a first user to generate a first spread (i.e., coded) symbol vector.

$$A_1 x = \begin{bmatrix} a_{11} & 0 & \ldots & 0 \\ a_{21} & 0 & \ldots & 0 \\ \vdots & \vdots & \vdots & \vdots \\ a_{m1} & 0 & \ldots & 0 \end{bmatrix} \begin{bmatrix} x_1 \\ x_2 \\ \vdots \\ x_n \end{bmatrix} = \begin{bmatrix} a_{11}x_1 \\ a_{21}x_1 \\ \vdots \\ a_{m1}x_1 \end{bmatrix}$$

A second orthogonal spreading matrix $A_2$ is provided for spreading a second downlink user data vector (e.g., data $x_2$, $x_3$) corresponding to a second user to generate a second spread (i.e., coded) symbol vector.

$$A_2 x = \begin{bmatrix} 0 & a_{12} & a_{13} & 0 \\ 0 & a_{22} & a_{23} & 0 \\ \vdots & \vdots & \vdots & \vdots \\ 0 & a_{m2} & a_{m3} & 0 \end{bmatrix} \begin{bmatrix} \vdots \\ x_2 \\ x_3 \\ \vdots \end{bmatrix} = \begin{bmatrix} a_{12}x_2 + a_{13}x_3 \\ a_{22}x_2 + a_{23}x_3 \\ \vdots \\ a_{m2}x_2 + a_{m3}x_3 \end{bmatrix}$$

Similarly, a $K^{th}$ orthogonal spreading matrix $A_K$ is provided for spreading a $K^{th}$ downlink user data vector (e.g., data $x_K$) corresponding to a $K^{th}$ user to generate a $K^{th}$ spread (i.e., coded) symbol vector ($A_K x$).

In some aspects of the disclosure, downlink user data for each of a plurality of user devices can be separately encoded (i.e., spread) and then combined to generate the coded symbols Ax=b. This may be performed at the network edge, or by remote computing resources, such as a data center. Each user device, upon receiving downlink transmissions and generating a digital baseband signal therefrom (possibly after performing equalization and/or multi-user detection), can decode the resulting spread symbol vector by using a corresponding de-spreading matrix or equivalent processing methods. For example, the de-spreading matrix can comprise a de-spreading code set corresponding to the code set used to spread the user device's downlink data prior to transmission. In some aspects, the de-spreading code set may comprise one or more rows or columns of the de-spreading matrix. In some aspects, the user device is configured to de-spread a control channel by employing a de-spreading code set corresponding to the code set used to spread the control information. A de-spreading code may be a complex conjugate of the corresponding spreading code.

In some aspects of the disclosure, the matrix A is a square matrix (i.e., m=n). In some aspects, matrix A is implemented as a DFT matrix. Matrix A may be implemented with complex-valued scaling factors, including amplitude scaling and/or phase offsets. In some aspects, matrix A is derived from values of a DFT matrix.

In code division multiple access communication aspects disclosed herein, a row or column of a DFT matrix is referred to as Spread-DFT code, and can be used to define an individual communication channel. It is usual in the CDMA literature to refer to codewords as "codes." In the downlink, each user device, for example, can be allocated a different codeword set, or code set, that encodes its signal. A set can comprise one or more codes. The user device employs a corresponding code set to decode the encoded signal. In some aspects, the corresponding code set can include complex-conjugates of the codes in the code set used to encode the user's signal. Similarly, a code set can be used to encode downlink control signals, and user devices can each employ a corresponding code set to decode the downlink control signals.

The spread-DFT matrix has the property that the dot product of any two distinct rows (or columns) is zero. Each row of a DFT matrix can correspond to a Spread-DFT function. Aspects of the disclosure can employ spreading based on an orthogonal matrix, wherein the matrix column vectors form an orthonormal set. Aspects of the disclosure can employ an appropriately scaled Fourier-based matrix wherein if it is multiplied by its conjugate transpose, it yields an identity matrix. In some aspects, a scaled DFT matrix is employed wherein the columns have unit magnitude and are orthogonal to each other. In aspects of the disclosure, each user device generates (or is otherwise provided with) a corresponding code set for decoding, wherein the code set is derived from the conjugate transpose of the DFT matrix used to spread the downlink data. The corresponding code set can be scaled in order to have unit norm.

The spreading and de-spreading matrices can have orthonormal columns. $A \in C^{m \times n}$ has orthonormal columns if its Gram matrix is the identity matrix. The columns have unit norm: $\|a_i\|^2 = a_i^H a_i = 1$, and the columns are mutually orthogonal: $a_i^H a_j = 0$, $i \neq j$, wherein "$^H$" denotes Hermitian. The conjugate transpose is also known as the adjoint matrix, adjugate matrix, Hermitian adjoint, or Hermitian transpose.

In some aspects, a product of orthogonal matrices may be employed for spreading. For example, a spreading matrix can be constructed from a product of two or more orthogonal matrices of equal size. In some aspects, an orthogonal matrix is employed for coding a data block, and decoding is effected by matrix multiplication of the coded data block with an inverse of the orthogonal matrix or a conjugate transpose of the orthogonal matrix. Sub-matrices of such orthogonal matrices can be used to multiplex different data streams together, and the orthogonal matrices can be provisioned to provide a resulting OFDM transmission signal with reduced PAPR. Alternatively, one or more quasi-orthogonal spreading matrices may be employed in aspects disclosed herein, wherein some trade-off is made between orthogonality and PAPR. For example, the spreading-code selector 232 may select a spreading matrix that optimizes a metric comprising some weighted combination of PAPR, bandwidth efficiency, and/or bit-error rate, possibly in response to CQI of UE channels.

Following the spreading operation 1006, a subcarrier mapper 1007 may be used to map spread symbols to specific OFDM subcarrier frequencies. For example, mapper 1007 may couple each spread data symbol to its assigned frequency bin of an M-point FFT 1008. The FFT 1008 output comprises a superposition of modulated OFDM subcarriers, which the spreading 1006 provides with a reduced PAPR. A cyclic prefix may be appended 1009 to the FFT output signal, followed by pulse shaping 1010 and quadrature modulation 1011.

Figure 6:
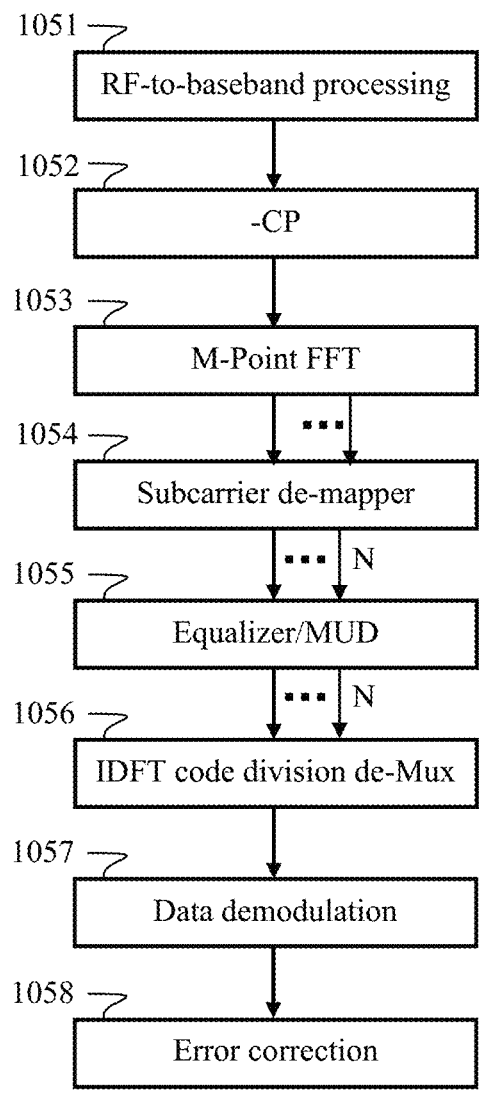
FIG. 6 is a flow diagram that illustrates a method that can be used for processing a received DL-SCH transmission in accordance with aspects of the disclosure.

FIG. 6 is a flow diagram depicting a method in accordance to some aspects of the disclosure, which can be implemented, for example, by instructions stored on one or more non-transitory computer-readable memories and configured to instruct one or more general-purpose processors (such as a processor core, a server, a distributed computing system, etc.) to perform functions disclosed herein. This flow diagram can represent functional elements embodied as hardware components configured to perform the operations disclosed herein.

RF-to-baseband processing 1051 is performed on received radio signals, such as WWAN downlink transmissions received by one or more network devices. Processing 1051 can be performed with radio hardware components, such as one or more antennas, amplifiers, filters, frequency down-converters, A/D converters, and the like. Cyclic prefix removal 1052 can be performed on the digital baseband signal. OFDM demodulation can be performed using an FFT algorithm 1053 implemented by a general-purpose processor or some application-specific integrated circuit.

Subcarrier de-mapper 1054 can select specific output bins of the FFT 1053 corresponding to OFDM subcarriers in the PRB(s) assigned to the one or more network devices. For example, N subcarrier values in each SC-FDMA symbol interval are collected and then equalized 1055 prior to being grouped into length-N blocks for code division de-multiplexing 1056. In some aspects, equalization 1055 can comprise multi-user detection (MUD) and/or inter-symbol interference cancellation. In one aspect, MUD comprises spatial de-multiplexing. Spatial de-multiplexing can comprise processing signal values from each of a plurality of antenna elements on the device. In some aspects, the device receives signal values from at least one other device's antennas and may be configured to perform joint processing (such as cooperative-MIMO) to separate a plurality of user channels transmitted on the same subcarriers.

A block of N equalized symbols in each OFDM symbol interval for the network device is processed by a code-division de-multiplexer 1056. The network device might process equalized data for other network devices, in which case, it can be configured to perform code-division de-multiplexing 1056 for each of a plurality of length-N blocks of equalized symbols. In such aspects, the code-division de-multiplexer 1056 might be parallelized.

The code-division de-multiplexer 1056 employs a code set corresponding to the code set employed by the downlink transmitter to encode the data addressed to the network device. For example, the code-division de-multiplexer 1056 might receive an assigned downlink code set broadcast by the scheduler in a WWAN. The downlink code set information is used by the network device to decode its data from the other user data transmitted in the physical downlink shared channel. The code-division de-multiplexer 1056 might also employ an additional code set to demultiplex certain control information that is transmitted in the downlink. In joint-processing scenarios, such as cooperative-MIMO, the network device might employ code sets for other network devices. Once the code-division de-multiplexer 1056 determines the codes it will employ for decoding the equalized spread symbols, it may generate a decode matrix or select corresponding columns in a predetermined decode matrix. It then performs a matrix multiplication between the decode matrix and the block(s) of equalized symbols to produce estimates of the original data symbols. Data demodulation 1057 and error correction 1058 may follow de-multiplexing 1056.

Figure 7:
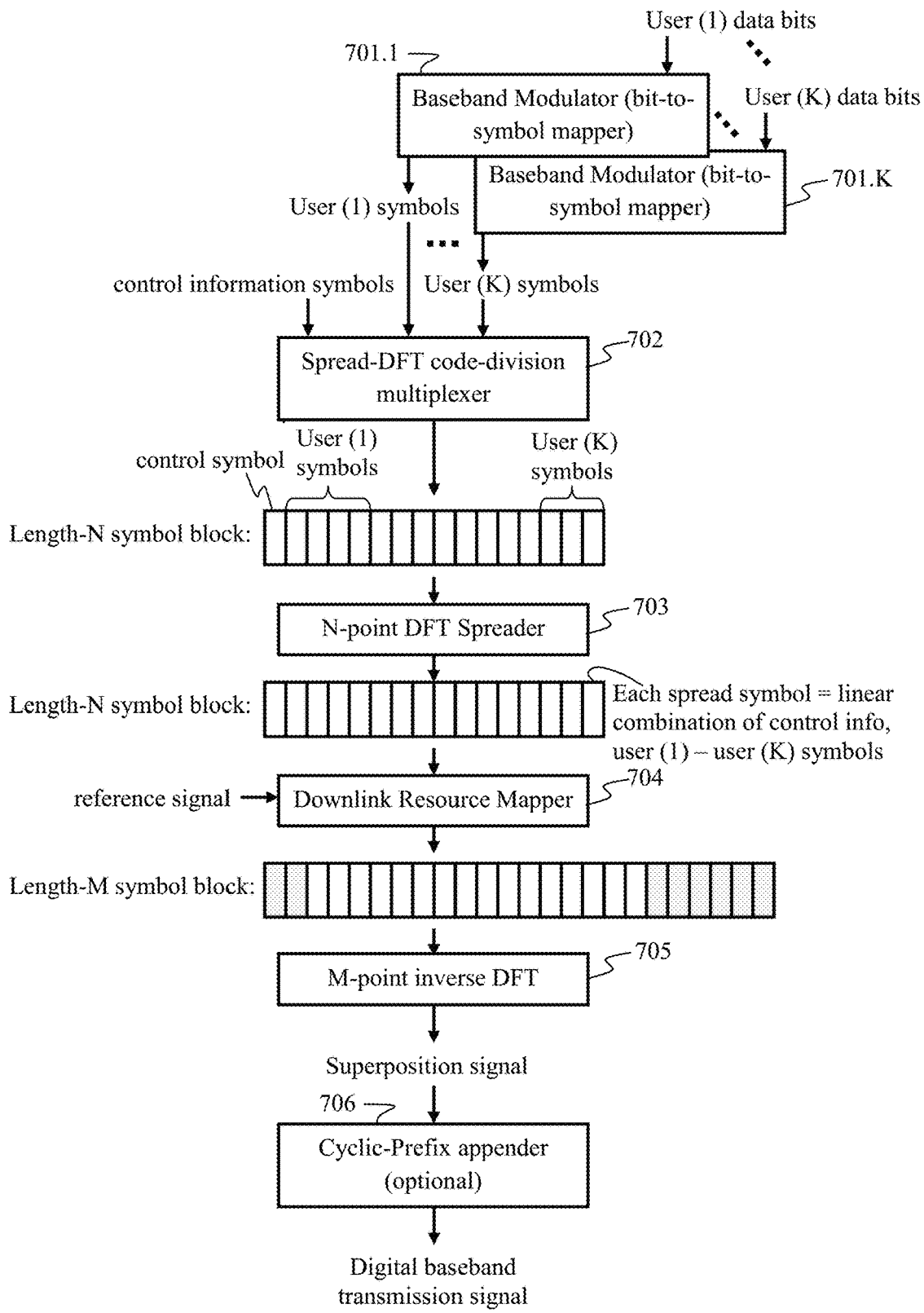
FIG. 7 depicts a set of modules, each comprising instructions stored on a non-transitory computer-readable memory and configured to instruct at least one general-purpose processor (such as a processor core, a server, a distributed computing system, a Cloud computing system etc.) to perform functions disclosed herein.

In one aspect of the disclosure, FIG. 7 depicts a set of modules, each comprising instructions stored on a non-transitory computer-readable memory and configured to instruct at least one general-purpose processor (such as a processor core, a server, a distributed computing system, etc.) to perform functions disclosed herein. In other aspects, one or more modules can comprise at least one specific-purpose processor, such as an application-specific integrated circuit or some other circuit.

A baseband modulator, which can be implemented as a software module 701.1, transforms a binary input to a multi-level sequence of complex values in at least one of several possible modulation formats, including binary phase shift keying (BPSK), quaternary PSK (QPSK), 16-level quadrature amplitude modulation (16-QAM) and 64-QAM. The modulator 701.1 can adapt the modulation format, and thereby the transmission bit rate, to match current channel conditions of the transceiver. The output signal is referred to as original data symbols.

In aspects of the disclosure, the baseband modulator can comprise a plurality K of software modules 701.1-701.K or software instantiations corresponding to K user devices, which can include K UEs being served in a RAN downlink. The modulators 701.1-701.K can be implemented on a single processor (such as in an eNodeB) or on multiple processors, possibly comprising distributed devices communicatively coupled by a network.

In some aspects, the systems disclosed herein can be implemented by a cluster of UEs and/or other RAN devices. In one aspect, the modulators 701.1-701.K are implemented by processors on different network devices, such as devices that might jointly process signals for uplink RAN transmissions.

User data streams for user 1 to user K are coupled to a spread-DFT code-division multiplexer 702, which combines the user data streams (possibly with control information) into length-N symbol blocks to be spread by an N-point DFT spreader 703. The multiplexer 702 can employ any of various types of grouping schemes to multiplex different user data streams (and optionally, control information) into the symbol blocks. Symbols corresponding to each user might be grouped consecutively and/or interleaved with other user data and/or control information. The number of user data symbols in a block can be selected according to a target data rate or QoS.

In some aspects, the DFT spreader 703 employs a DFT spreading matrix, which multiplies each length-N symbol block produced by the multiplexer 702. Since each column in the spreading matrix corresponds to a different orthogonal spreading code, the position of each symbol in the input symbol block can constitute a spreading code assignment. These spreading code assignments can be broadcast to the UEs to inform them as to which codes to employ for decoding their data from the physical downlink shared channel.

The DFT spreader 703 outputs a length-N block of spread symbols, wherein each spread symbol comprises a linear combination of symbols in the corresponding block that is input to the DFT spreader 703. A resource mapper, such as downlink resource mapper 704, maps the spread symbols to resource blocks, which constitute a plurality (e.g., N) of OFDM subcarrier frequencies and at least one OFDM symbol interval. In some aspects, the resource mapper 704 is configured to map each length-N spread-symbol block to N subcarrier frequencies in a single OFDM symbol interval. Thus, each of the N spread symbols in a block may be mapped to a single resource element, and each resource element can comprise a different one of the N subcarrier frequencies in a single OFDM symbol interval. In some aspects, the resource mapper 704 receives a reference signal, which can comprise one or more reference symbols to be modulated on one or more subcarrier frequencies, possibly at different symbol intervals. The resource mapper 704 can map the reference symbols to predetermined resource elements. The resource mapper 704 may be coordinated with the DFT spreader 703, such as to map a plurality of spread-symbol blocks to consecutive resource blocks, wherein the plurality of spread-symbol blocks are generated from original data symbol blocks having similar PAPR, such as original data-symbol blocks having the same modulation order and/or scaling factor.

The resource mapper 704 might output a zero-padded length-M symbol block, which is input to an M-point inverse DFT 705. In some aspects, alternative approaches to generating an OFDM signal are employed, and the resource mapper 704 is appropriately configured to direct an OFDM modulator to modulate subcarrier frequencies corresponding to assigned resource blocks.

The output of the inverse DFT 705 is an OFDM transmission signal comprising a superposition of modulated subcarriers. The combination of the multiplexer 702 and the spreader 703 is configured to provide the superposition, which is a multiple-access signal comprising a plurality of multiplexed user data streams, with low (i.e., reduced) PAPR. Additional processing, such as appending a cyclic prefix 706, can be performed.

Figure 8:
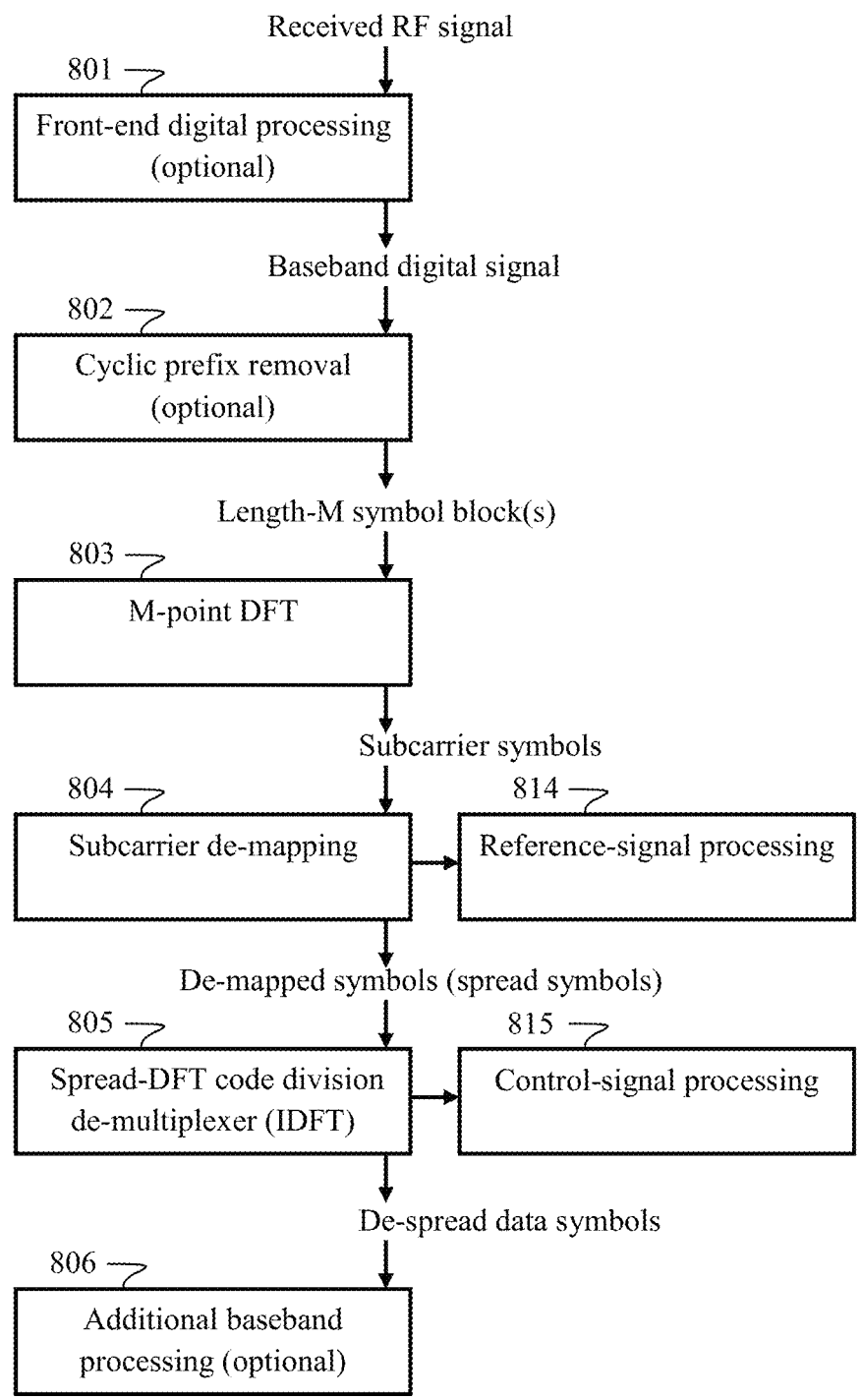
FIG. 8 depicts a set of modules, each comprising instructions stored on a non-transitory computer-readable memory and configured to instruct at least one general-purpose processor (such as a processor core, a server, a distributed computing system, a Cloud computing system, etc.) to perform functions disclosed herein.

In one aspect of the disclosure, FIG. 8 depicts a set of modules, each comprising instructions stored on a non-transitory computer-readable memory and configured to instruct at least one general-purpose processor (such as a processor core, a server, a distributed computing system, etc.) to perform functions disclosed herein. In other aspects, one or more modules can comprise at least one specific-purpose processor, such as an application-specific integrated circuit or some other circuit.

By way of example, but without limitation, the set of modules depicted in FIG. 8 can reside in a UE and be configured to process downlink signals in a RAN, or the modules can reside within a cluster of devices configured to jointly process received downlink signals in a RAN. At least one digital front-end processor 801 converts received downlink RF signals to a digital baseband symbol stream. A cyclic prefix may be removed 802, and length-M symbol blocks from the symbol stream are input to an OFDM demodulator, such as a DFT 803. Values modulated on a UE's assigned OFDM subcarrier frequencies are selected from the DFT 803 output by a subcarrier de-mapper 804. Signals output from the DFT 803 or the de-mapper 804 may be equalized (not shown) prior to de-spreading. The de-mapped symbols comprise spread user data symbols (and possibly spread control information), and optionally, reference symbols. A reference-signal processor 814 calculates channel state information, CQI, and/or any other performance indicator from the reference symbols. This information may be transmitted back to eNodeBs in the RAN.

The spread user data symbols intended for the UE (and possibly spread control information) are decoded in a spread-DFT code division de-multiplexer 805. Control information is optionally processed by a control-signal processor 815. As described above, the de-multiplexer 805 can employ de-spreading codes corresponding to the spread-DFT CDMA channel(s) assigned to the UE by the radio access network. The de-multiplexer 805 de-multiplexes (and thus, de-spreads) the UE's user data from other spread-DFT multiple-access channels in the downlink. In some aspects, such as when a UE performs joint processing, the de-multiplexer 805 can employ de-spreading codes corresponding to one or more spread-DFT CDMA channels assigned to at least one other UE. The de-multiplexer 805 can determine the de-spreading code(s) from control information in a broadcast channel, such as physical downlink control channel, for example.

One or more spread-DFT CDMA channels may be assigned for control information. Thus, the de-multiplexer 805 may de-spread control information from the downlink signal, and the control information can optionally be processed by a control-signal processor 815. De-spread user data is typically subject to additional processing operations 806. In some aspects, multi-user detection (including spatial de-multiplexing) may be performed in blocks 805 and/or 806.

Figure 9:
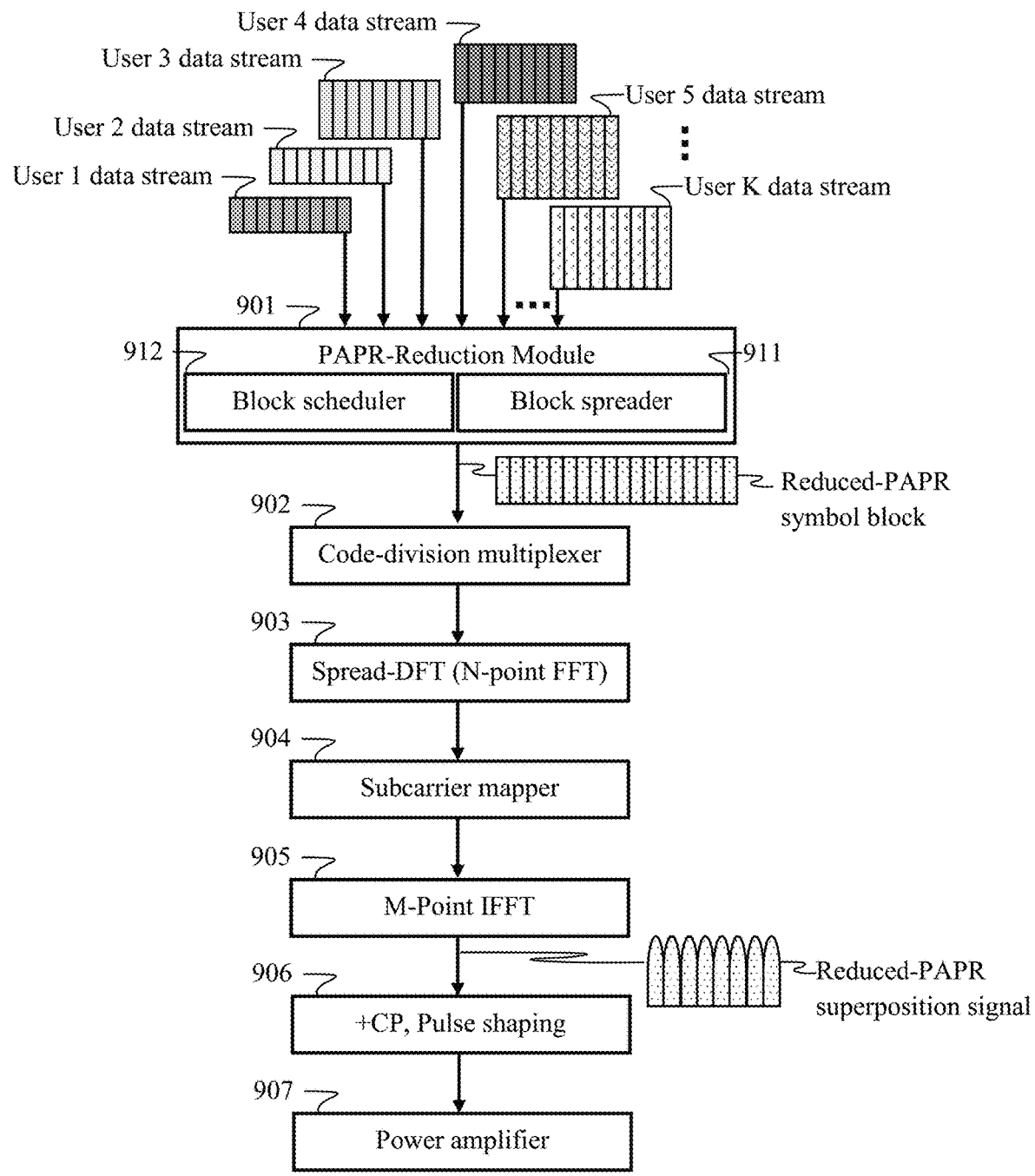
FIG. 9 is a diagram that depicts a radio transmitter configured in accordance with aspects of the disclosure.

As depicted in FIG. 9, a radio transmitter configured in accordance with aspects disclosed herein can include a controller, such as at least one computer or data processor, at least one non-transitory computer-readable memory medium embodied as a memory that stores a program of computer instructions, and at least one suitable radio frequency (RF) transmitter for wireless communications with at least one other transceiver via one or more antennas. The exemplary aspects of the disclosure (including those depicted in the flow diagrams and block diagrams) may be implemented, at least in part, by computer software executable by the data processor. The transmitter shown in FIG. 9 can comprise an eNodeB or some other type of base transceiver station, a relay, a user device (e.g., a UE), or some other transceiver.

A plurality of user data streams (user data streams 1-K) are input to a PAPR-reduction module 901, which can include a block scheduler 912 and/or a block spreader 911. A reduced-PAPR symbol block is output from module 901 and coupled into a code division multiplexer 902, which multiplexes different user data streams together into symbol blocks that are spread by a spread-DFT module 903. A PRB mapper, such as a subcarrier mapper 904, maps the spread symbols from the spread-DFT module 903 to a PRB that is common to a plurality of user devices. The plurality of user devices share the same PRB by the implementation of the multiplexing 902 and spreading 903, which enables the spreading 903 to the OFDM modulator's (e.g., IFFT 905) output signal to have a low (e.g., reduced) PAPR. Additional signal processing modules (e.g., CP & pulse shaping 906, and power amplifier 907) can be provided.

In some aspects of the disclosure, the PAPR of the symbol block output from module 901 affects the PAPR of the superposition signal output from the IFFT 905. As the PAPR of the module's 901 output is reduced, a subsequent reduction in the IFFT's 905 output occurs. Thus, the block scheduler 912 and/or the block spreader 911 can be configured to reduce the PAPR of the superposition signal by reducing the PAPR of the symbol block output from module 901.

In some aspects, the block scheduler 912 groups user data streams having similar PAPR, such as user data streams having the same modulation order and that are scheduled to be provided with the same (or similar) scaling factor. User data streams that are grouped together in this manner are scheduled for the same PRBs. The multiplexer 902 assigns a codeword set to each user data stream, and the user is informed of its assigned codeword set so it can decode its downlink data stream.

In some aspects, the spreader 903 spreads each input symbol according to its location in the input length-N symbol block. For example, the spreader 903 might perform a matrix multiplication between a DFT matrix and the length-N symbol block vector, or it may perform an FFT operation on the symbol block. In such aspects, the multiplexer 902 effectively performs code assignments by inserting data symbols into specific positions in the length-N symbol block. In some aspects, the block scheduler 912 and the multiplexer 902 are configured to generate consecutive PRBs having similar PAPR.

In some aspects, the block spreader 911 is configured to spread the user data streams (user data streams 1-K) with one or more spreading codes that result in reduced PAPR. In some aspects, the spreading code(s) are predetermined and known by the user devices such that the user devices can perform de-spreading. In some aspects, information about spreading codes employed by the block spreader 911 is communicated to the user devices, such as in a broadcast channel.

In some aspects, the module 901 comprises both the block spreader 911 and the block scheduler 912. The spreader 911 and scheduler 912 may be configured to operate in a manner whereby the scheduler selects certain ones of the user data streams to be combined and spread by the spreader 911 in order to produce a spread signal with reduced PAPR.

Figure 10:
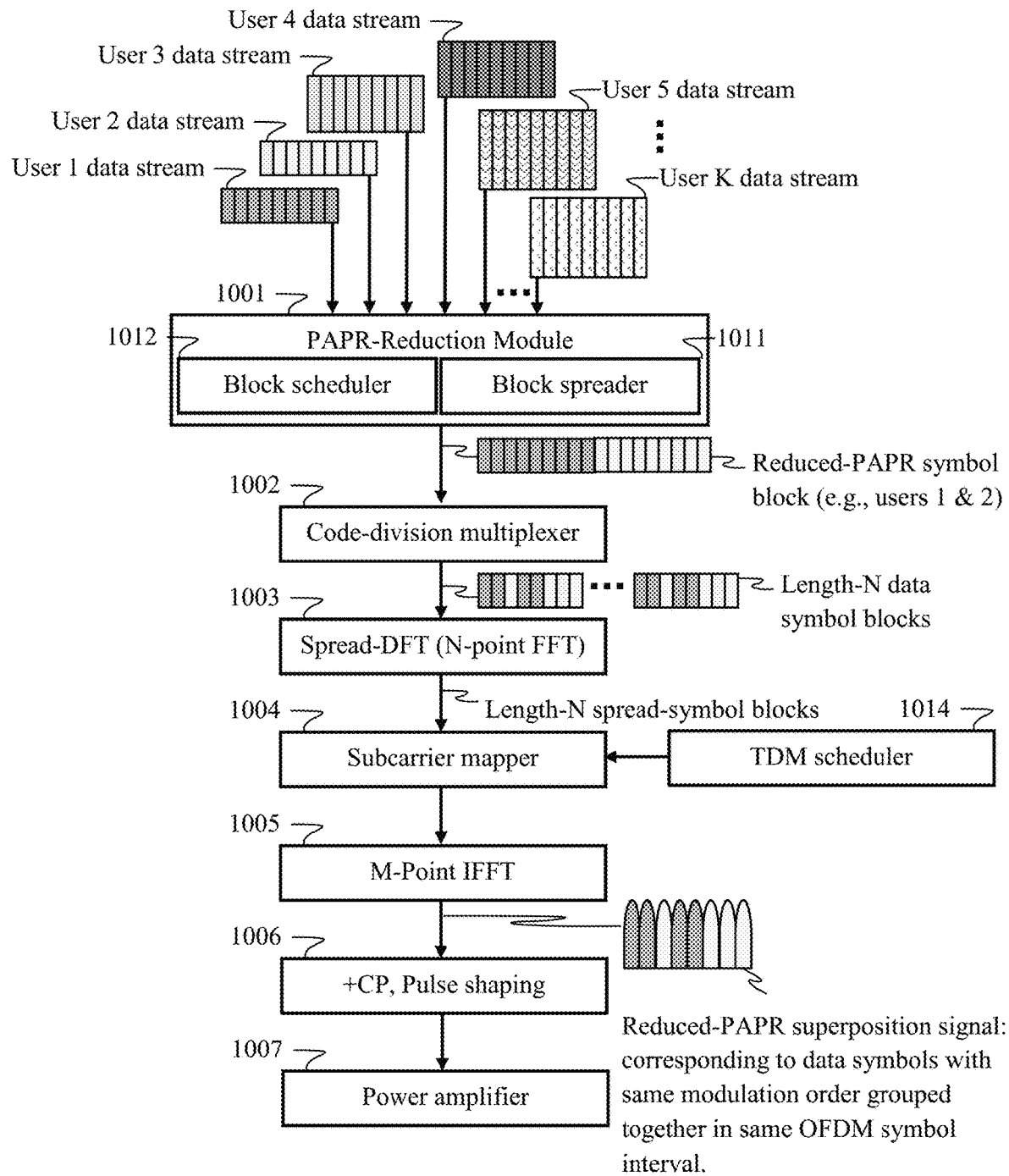
FIG. 10 is a diagram that depicts a radio transmitter configured in accordance with aspects of the disclosure.

FIG. 10 is a block diagram that comprises many of the same components as shown in FIG. 9. An additional time-division multiplexing (TDM) scheduler 1014 is shown coupled to subcarrier mapper 1004. In some aspects, the TDM scheduler 1014 controls subcarrier mapper 1004, such as to consecutively order spread-symbol blocks that correspond to length-N data symbol blocks (which are input to spreader 1003) having similar scale and/or modulation order. In some aspects, power amplifier's 1007 back-off can be adapted to the PAPR of the superposition signal it amplifies. Since the TDM scheduler 1014 can be configured to reduce the rate at which the superposition signal's dynamic range changes, this can simplify the adaptive back-off control of the power amplifier 1007. For example, the TDM scheduler 1014 can reduce the dynamic range's rate of change from a symbol-interval time scale, to a time scale comprising multiple symbol intervals.

As illustrated in FIG. 10, user data streams 1 and 2 have similar modulation order and scale, user data streams 3 and 4 have similar modulation order and scale, and user data streams 5-K have similar modulation order and scale. The block scheduler 1012 groups user data streams together that have similar modulation order and scale. For example, the output of module 1001 is a signal comprising user data streams 1 and 2. Code-division multiplexer 1002 can perform any combination of grouping and interleaving user data streams 1 and 2 into length-N data symbol blocks, which are spread 1003, mapped 1004, and OFDM-modulated 1005 to produce a superposition signal having reduced PAPR.

The combination of DFT-spreading 1003, mapping 1004, and OFDM-modulating 1005 effectively maps each symbol in the length-N data symbol block to a corresponding superposition pulse position in the OFDM modulator's 1005 output. Each pulse position corresponds to a spreading-code vector (e.g., a column in a DFT spreading matrix).

In some aspects, the pulses are sinc-shaped, since the Fourier transform of a rectangle function is a sinc function. Since sinc functions have a higher PAPR than other pulse shapes, it can be advantageous in some aspects to provide frequency-domain windowing at some point before the IFFT 1005. For example, the subcarrier mapper 1004 and/or the spreader 1003 can be configured to provide shaping to spread-symbol blocks such that when the spread-symbol blocks are provided to the input bins of the IFFT, the edges of the block are tapered or rounded.

This frequency-domain windowing spreads each pulse in the time domain. Thus, the cost of reducing PAPR can be some combination of reduced bandwidth efficiency and increased inter-symbol interference. For example, aspects of the disclosure might provide for some combination of increasing the inter-pulse spacing in the IFFT 1005 output and accepting some interference between adjacent pulses. Alternatively, windowing might comprise employing subcarriers outside the set of the N subcarriers to which the spread symbols are otherwise mapped 1004.

Figure 11:
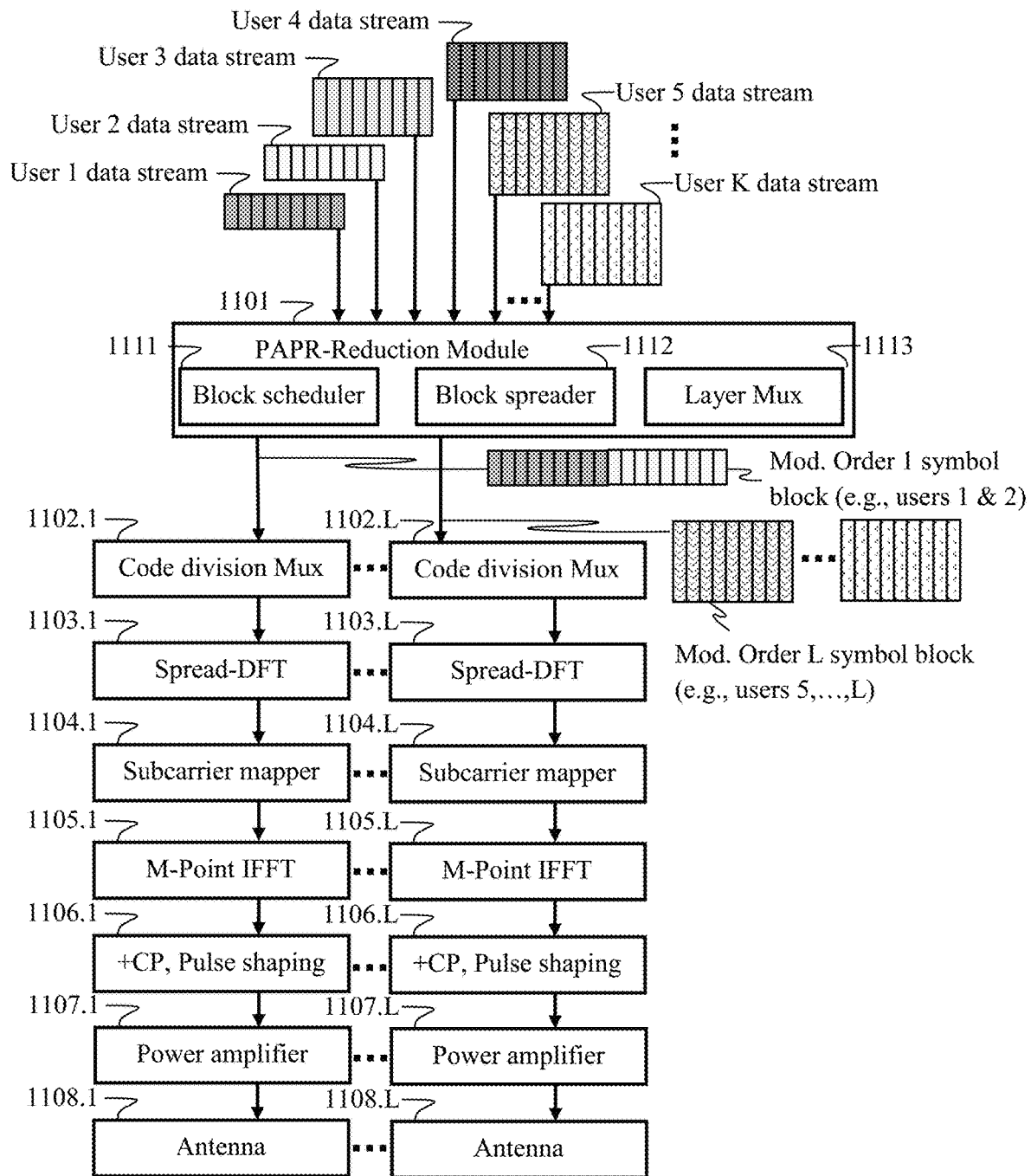
FIG. 11 is a diagram that depicts a radio transmitter configured in accordance with aspects of the disclosure.

In FIG. 11, PAPR-reduction module 1101 comprises a layer multiplexer 1113. Block scheduler 1111. In some aspects, the block scheduler 1111 groups user data streams 1 and 2 together, since they have similar modulation order and scale, and user data streams 5-K are grouped together because they have similar modulation order and scale. For example, the block scheduler 1111 can produce a plurality L of groupings based on modulation and/or scale. The layer multiplexer 1113 can combine the user data in each grouping into a different layer. In some cases, the layer multiplexer 1113 might combine groupings into a single layer.

As shown in FIG. 11, there can be up to L layers, and the layers are processed in parallel by separate processing chains. For example, layer 1 is processed by code-division multiplexer 1102.1, spreader 1103.1, mapper 1104.1, IFFT 1105.1, cyclic prefix appender and pulse shaping 1106.1, power amplifier 1107.1, and antenna system 1108.1. Layer L is processed by code-division multiplexer 1102.L, spreader 1103.L, mapper 1104.L, IFFT 1105.L, cyclic prefix appender and pulse shaping 1106.L, power amplifier 1107.L, and antenna system 1108.L.

Figure 12:
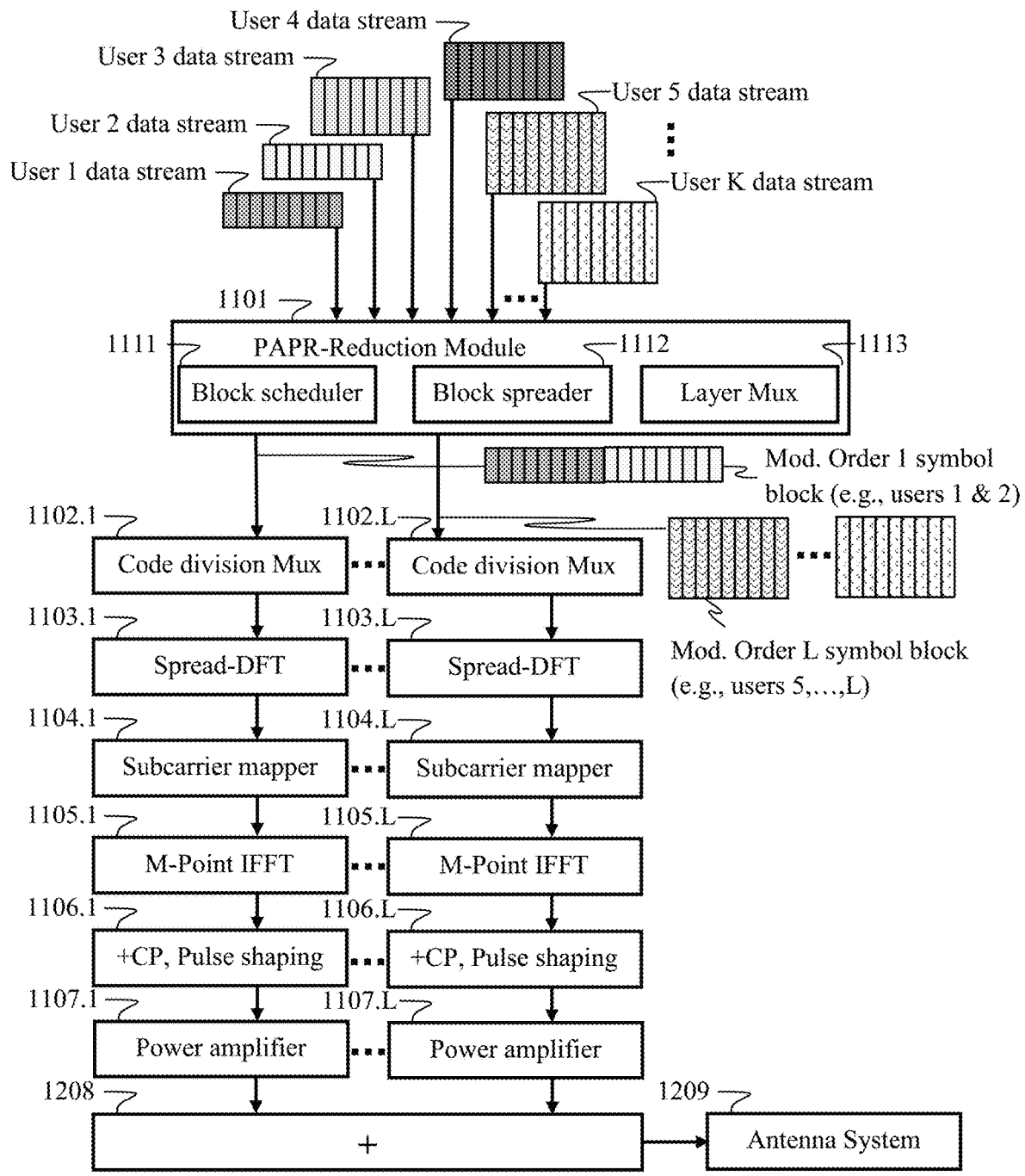
FIG. 12 is a diagram that depicts a radio transmitter configured in accordance with aspects of the disclosure.

As shown in FIG. 12, the L separate processing chains might be combined in a combiner 1208 and share a common antenna system 1209.

Figure 13:
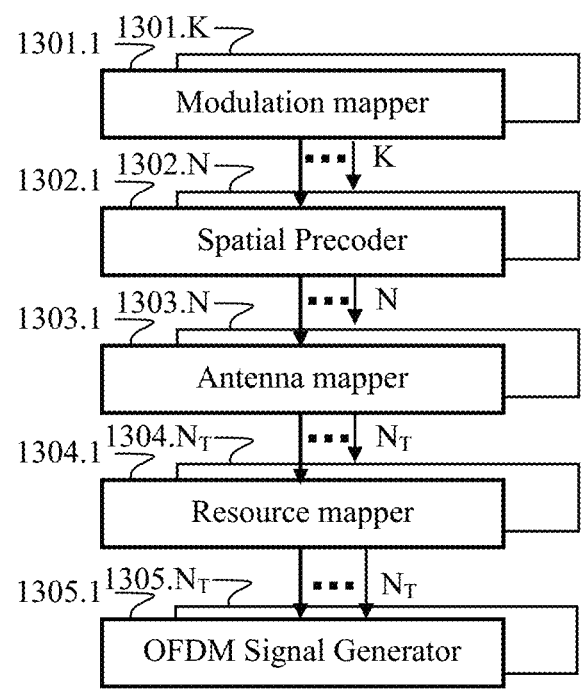
FIG. 13 is a block diagram that illustrates components of a radio transmitter according to some aspects of the disclosure.

FIG. 13 is a block diagram that illustrates components of a radio transmitter according to some aspects of the disclosure. The functional blocks depicted herein can comprise steps of a method. In some aspects, one or more of the blocks can be implemented by a processor programmed with instructions, such as software code residing on a non-transitory computer-readable memory.

A modulation mapper 1301.1-1301.K receives as input a plurality K of user data bit streams and generates complex-valued symbols from each bit stream to produce K user data streams, which are input to a spatial precoder 1302.1-1302.N. The spatial precoder 1302.1-1302.N can be configured to perform code-division multiplexing of the K user data streams, followed by spreading by the corresponding code-division multiple-access code space, and then spatial precoding for each of a plurality N of OFDM subcarrier frequencies. A plurality $N_T$ of antenna-array weights (such as corresponding to $N_T$ antennas of a distributed antenna system, for example) are generated for each of the N subcarrier frequencies. The antenna-array weights for each subcarrier frequency are mapped by antenna mapper 1303.1-1303.N to $N_T$ antennas. A resource mapper 1304.1-1304.$N_T$ may be associated with each antenna and configured to assign PRBs to each user data stream. An OFDM signal generator 1305.1-1305.$N_T$ modulates precoded user data symbols onto their corresponding subcarrier frequencies.

With reference to the spatial precoder 1302.1-1302.N, any of various techniques are employed for calculating antenna array weights for transmission of user data in a distributed antenna system. Such implementations can be used for downlink transmissions. Any of these techniques can be configured to produce additional spatial subchannels that can be used to transmit signals that reduce the PAPR of transmissions amplified by individual power amplifiers in the distributed antenna system. In such aspects, the distributed antenna system can be configured to employ additional spatial degrees of freedom to convey signals that can reduce the PAPR at each transmitter or antenna. These PAPR-reduction signals would generally not be detectable by UEs in the downlink, since they occupy spatial subchannels that are not employed to communicate with any UE. Their primary purpose is to reduce the PAPR of one or more of the individual downlink transmissions, and this objective can be achieved without sacrificing bandwidth efficiency. For example, each subchannel selected for such signaling may have been deemed to be too poor for use as a multiple-access channel, or each such selected subchannel serves a dummy transceiver, which is provided only for establishing one or more subchannels for PAPR reduction.

It should be appreciated that any of various spatial multiplexing signal processing techniques may be employed for precoding the transmissions, including, but not limited to maximum ratio, minimum mean squared error, dirty-paper coding, and zero-forcing techniques.

In some aspects, eigenvalue-decomposition approaches, such as singular value decomposition, may be employed for transmitter spatial processing. For example, a MIMO channel formed by the $N_T$ transmit antennas comprising multiple transmission nodes (e.g., base stations) and $N_R$ receive antennas comprising multiple UEs can be characterized by an $N_R \times N_T$ channel response matrix H for each OFDM subband, wherein each matrix element of H denotes coupling or complex channel gain between transmit antenna j and receive antenna i. The rank of H is the sum of non-zero singular values $\lambda_i$ in which each $\lambda_i$ corresponds to an eigenmode of the channel (i.e., an eigen-channel, or sub-space channel). Each non-zero eigenmode can support a data stream, thus the MIMO channel can support k spatial sub-space channels, where k is the number of non-zero eigenvalues $\lambda_i$. In some aspects, the MIMO channel is assumed to be full rank with $S=N_T \le N_R$. In some aspects, the MIMO channel is configured to be less than full rank, with $D=N_R<N_T$.

For data transmission with eigensteering, eigenvalue decomposition can be performed on a correlation matrix of H to obtain S eigenmodes of H, as follows:

$$R = H^H \cdot H = E \cdot \Lambda \cdot E^H,$$

where R is a correlation matrix of H; E is a unitary matrix whose columns are eigenvectors of R; $\Lambda$ is a diagonal matrix of eigenvalues of R; and "$^H$" denotes a conjugate transpose.

A unitary matrix U is characterized by the property $U^H U = I$, where I is the identity matrix. The columns of a unitary matrix are orthogonal to one another, and each column has unit power. The matrix E is also called an "eigenmode" matrix or a "transmit" matrix and may be used for spatial processing by the distributed antenna system to transmit user data on the S eigenmodes of H. The eigenmodes may be viewed as orthogonal spatial channels obtained through decomposition. The diagonal entries of $\Lambda$ are eigenvalues of R, and represent the power gains for the S eigenmodes. The eigenvalues in $\Lambda$ may be ordered from largest to smallest, and the columns of E may be ordered correspondingly. Singular value decomposition may also be performed to obtain matrices of left and right eigenvectors, which can be used for eigensteering.

For data transmission with eigensteering, the transmitting entity can perform spatial processing for each subband as follows:

$$z = E \cdot s,$$

where s is a vector with up to S data symbols to be sent on a particular frequency subband; and z is a vector with $N_T$ spatially processed symbols for the subband. In general, D data symbols may be sent simultaneously on D (best) eigenmodes of H for each subband, where $1 \le D \le S$. The D data symbols in s are spatially processed with D columns of E corresponding to the D selected eigenmodes. In accordance with aspects of the disclosure, any of the remaining S–D eigenmodes can be employed to reduce the PAPR of at least one of the D transmissions. For example, PAPR-reduction signals can correspond to any of the remaining S–D columns of E.

In some aspects, specific one(s) of the transmitters (for example, transmitters having power constraints, such as due to being battery powered or otherwise having limited access to power) can be selected for PAPR reduction, and then signals to be transmitted on one or more of the remaining S–D eigenmodes are calculated to provide an acceptable PAPR for the selected transmitter(s). The PAPR-reduction signals can be a function of the pre-coding, user data symbols, and/or any power scaling of the subspace channels. In some aspects, the number of transmitting antennas $N_T=S$, and the number of receiving antennas $N_R=D$, so there is unutilized rank in H that can be exploited for providing PAPR reduction without degrading performance in any of the D eigenmodes. In some aspects, any of various iterative techniques can be employed to calculate the PAPR-reduction signals. A trellis exploration algorithm can be adapted to solve this problem and can quickly converge to at least a near-optimal solution. Other algorithms, such as successive interference cancellation, can be adapted to reduce transmission peaks.

For data transmission with a spreading matrix, such as a CI spreading matrix, the transmitting entity may perform spatial processing for each subband as follows:

$$z_{ss} = V \cdot s$$

where V is a spreading matrix for the subband; and $z_{ss}$ is a vector with up to $N_T$ spread symbols for the subband. Each data symbol in s is multiplied with a respective column of V to obtain up to $N_T$ spread symbols.

In general, D data symbols can be sent simultaneously on each subband with matrix spreading, where $1 \le D \le S$. The D data symbols in s may be multiplied with a $N_T \times D$ spreading matrix V(k) to obtain $N_T$ spatially processed symbols for $z_{ss}$. Each spatially processed symbol for each subband includes a component of each of the D data symbols being sent on the subband. The $N_T$ spatially processed symbols for each subband are then transmitted on the S spatial channels of H.

In one aspect of the disclosure, wherein D<S, an additional spreading matrix is calculated and used to multiply the D data symbols. The additional spread data symbols are transmitted on one or more of the remaining S–D spatial subchannels, wherein the additional spreading matrix can be calculated to reduce the PAPR of transmissions from one or more of $N_T$ antennas. Alternatively, or in addition to the method above, one or more data symbols can be selected to provide PAPR reduction. As stated above, any of various techniques, including iterative techniques, can be employed to calculate the PAPR-reduction signals.

Figure 14:
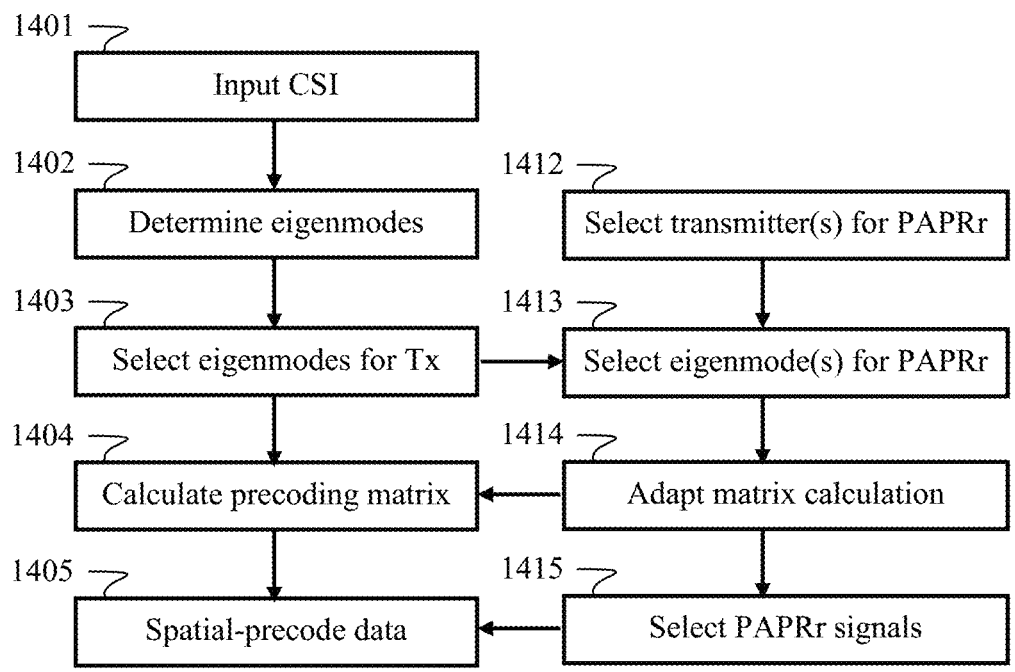
FIG. 14 is a flow diagram that depicts the function of a spatial precoder, such as the spatial precoder 1302.1-1302.N, according to some aspects of the disclosure.

FIG. 14 is a flow diagram that depicts the function of the spatial precoder 1302.1-1302.N according to some aspects of the disclosure. Channel state information (CSI) for the RAN downlink is input 1401 for calculating the eigenmodes 1402. At least some of the eigenmodes are selected for transmission 1403. A spatial precoding matrix is calculated 1404 and used to precode 1405 user data streams for transmission.

It should be appreciated that some of the steps depicted in FIG. 14 can be combined. One or more transmitters can be selected for PAPR reduction 1412. For example, the antenna array might comprise one or more transceivers with power constraints. Thus, the one or more transceivers might be selected in order to improve their power efficiency. One or more eigenmodes are selected for PAPR reduction 1413. Processes 1403 and 1413 can be performed concurrently. Based on the eigenmodes selected for PAPR reduction, the precoding matrix may be adapted 1414. The precoding matrix is generated based on both the eigenmodes providing for user downlink channels and the eigenmode(s) providing for PAPR reduction. Thus processes 1404 and 1414 can be combined. Precoding data 1405 can comprise precoding user data streams, any control information, and the PAPR-reduction signals. Selecting the PAPR-reduction signals 1415 can comprise an iterative procedure whereby the PAPR-reduction signals are adapted relative to each user-data block in order to achieve some PAPR-reduction metric. For example, the metric might comprise a threshold PAPR for each of the selected transmitters, a PAPR average across the selected transmitters, or a minimum PAPR achieved from a predetermined number of iterations or during a predetermined processing interval. Other PAPR-reduction metrics might be employed.

The various blocks shown in the figures may be viewed as method steps, and/or as operations that result from operation of computer program code, and/or as a plurality of coupled logic circuit elements constructed to carry out the associated function(s).

In general, the various exemplary aspects may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary aspects of the disclosure may be practiced in various components such as integrated circuit chips and modules, and that the exemplary aspects of this disclosure may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary aspects of this disclosure.

Various modifications and adaptations to the foregoing exemplary aspects of this disclosure may become apparent to those skilled in the relevant arts in view of the foregoing description, when read in conjunction with the accompanying drawings. However, any and all modifications will still fall within the scope of the non-limiting and exemplary aspects of this disclosure.

The invention claimed is:

1. An apparatus, comprising:
a code-division multiplexer configured to multiplex each of a plurality of data streams into a different one of a plurality of spread-Discrete Fourier Transform (DFT) code division multiple-access channels;
a DFT spreader configured to spread multiplexed original data symbols to produce a plurality of DFT-spread data symbols;
a mapper configured to map each one of the plurality of DFT-spread data symbols to one of a plurality of Orthogonal Frequency Division Multiplexing (OFDM) subcarriers; and
an inverse discrete Fourier transform (IDFT) configured to generate an OFDM transmission signal comprising the plurality of OFDM subcarriers, each modulated with one of the plurality of spread data symbols;
wherein the code-division multiplexer is configured to arrange the original data symbols in each of a plurality of length-N blocks to be spread by the DFT spreader, such that each of the plurality of data streams is spread with a code set corresponding to its spread-DFT code division multiple access channel.

2. The apparatus of claim 1, wherein the DFT spreader comprises the code-division multiplexer.

3. The apparatus of claim 1, further comprising a scheduler communicatively coupled to the code-division multiplexer and configured to assign each spread-DFT code division multiple access channel to one of a plurality of User Equipments (UEs).

4. The apparatus of claim 1, wherein the DFT spreader employs at least one of a set of orthogonal codes and a set of quasi-orthogonal codes to spread the multiplexed original data symbols.

5. The apparatus of claim 1, wherein the OFDM transmission signal comprises a sequence of single-carrier frequency division multiple access (SC-FDMA) symbols, each SC-FDMA symbol comprising a plurality of code-division multiple-access channels.

6. The apparatus of claim 1, wherein the mapper maps the plurality of DFT-spread data symbols to contiguous or non-contiguous OFDM subcarriers.

7. The apparatus of claim 1, further comprising a scheduler configured to assign multiple ones of the plurality of data streams to a common Physical Resource Block (PRB) based on at least one of similarity in modulation scheme and similarity in scaling factor.

8. The apparatus of claim 7, further comprising a layer mapper configured to map each PRB to at least one of a different layer and a different power amplifier.

9. A method, comprising:
multiplexing each of a plurality of data streams into a different one of a plurality of spread-Discrete Fourier Transform (DFT) code division multiple-access channels;
spreading multiplexed original data symbols to produce a plurality of DFT-spread data symbols;
mapping each one of the plurality of DFT-spread data symbols to one of a plurality of Orthogonal Frequency Division Multiplexing (OFDM) subcarriers; and
operating an inverse discrete Fourier transform (IDFT) on the DFT-spread data symbols to generate an OFDM transmission signal;
wherein the multiplexing arranges the original data symbols in each of a plurality of length-N blocks for spreading, such that each of the plurality of data streams is spread with a code set corresponding to its spread-DFT code division multiple access channel.

10. The method of claim 9, wherein each of the plurality of DFT-spread data symbols is a single-carrier frequency division multiple access (SC-FDMA) symbol comprising a plurality of sub-symbols that comprises the original data symbols code-division multiplexed into the plurality of spread-DFT code division multiple-access channels.

11. The method of claim 9, wherein the OFDM transmission signal is a downlink signal.

12. The method of claim 9, wherein the multiplexing further comprises assigning each spread-DFT code division multiple access channel to one of a plurality of User Equipments (UEs).

13. The method of claim 9, wherein the spreading employs at least one of a set of orthogonal codes and a set of quasi-orthogonal codes to spread the multiplexed original data symbols.

14. The method of claim 9, wherein the OFDM transmission signal comprises a sequence of single-carrier frequency division multiple access (SC-FDMA) symbols, each SC-FDMA symbol comprising original data symbols multiplexed to a plurality of code-division multiple-access channels.

15. The method of claim 9, wherein the mapping is configured to map the plurality of DFT-spread data symbols to contiguous or non-contiguous OFDM subcarriers.

16. The method of claim 9, further comprising assigning multiple ones of the plurality of data streams to a common Physical Resource Block (PRB) based on at least one of similarity in modulation scheme and similarity in scaling factor.

17. The method of claim 16, further comprising mapping each PRB to at least one of a different layer and a different power amplifier.

18. An Orthogonal Frequency Division Multiplexing (OFDM) transmitter apparatus configured to generate an OFDM multiple-access signal with low Peak-to-Average Power, the transmitter apparatus comprising at least one processor, at least one memory in electronic communication with the at least one processor, and instructions stored in the at least one memory, the instructions executable by the at least one processor to:

multiplex each of a plurality of data streams into a different one of a plurality of spread-Discrete Fourier Transform (DFT) code division multiple-access channels;

spread multiplexed original data symbols to produce a plurality of DFT-spread data symbols;

map each one of the plurality of DFT-spread data symbols to one of a plurality of OFDM subcarriers; and perform an inverse discrete Fourier transform (IDFT) on the DFT-spread data symbols to generate an OFDM transmission signal;

wherein the instructions to multiplex provide for arranging the original data symbols in each of a plurality of length-N blocks for spreading, such that each of the plurality of data streams is spread with a code set corresponding to its spread-DFT code division multiple access channel.

19. The apparatus of claim 18, wherein the instructions to multiplex provide for assigning each spread-DFT code division multiple access channel to one of a plurality of User Equipments (UEs).

20. The apparatus of claim 18, wherein the instructions to spread provide for employing at least one of a set of orthogonal codes and a set of quasi-orthogonal codes to spread the multiplexed original data symbols.

21. The apparatus of claim 18, wherein the OFDM transmission signal comprises a sequence of single-carrier frequency division multiple access (SC-FDMA) symbols, each SC-FDMA symbol comprising original data symbols multiplexed to a plurality of code-division multiple-access channels.

22. The apparatus of claim 18, wherein the instructions to map provides for mapping the plurality of DFT-spread data symbols to contiguous or non-contiguous OFDM subcarriers.

23. The apparatus of claim 18, further comprising instructions to assign multiple ones of the plurality of data streams to a common Physical Resource Block (PRB) based on at least one of similarity in modulation scheme and similarity in scaling factor.

24. The apparatus of claim 23, further comprising instructions to map each PRB to at least one of a different layer and a different power amplifier.

* * * * *